United States Patent
Saijo et al.

(10) Patent No.: US 11,260,635 B2
(45) Date of Patent: Mar. 1, 2022

(54) RESIN COMPOSITION, METHOD FOR PRODUCING CURED ARTICLE, CURED ARTICLE, FLEXIBLE SUBSTRATE, AND FLEXIBLE DISPLAY

(71) Applicant: TOKYO OHKA KOGYO CO., LTD., Kawasaki (JP)

(72) Inventors: Hideki Saijo, Kawasaki (JP); Hiroyuki Kikuchi, Kawasaki (JP); Jiro Hikida, Kawasaki (JP); Dai Shiota, Kawasaki (JP)

(73) Assignee: Tokyo Ohka Kogyo Co., Ltd., Kawasaki (JP)

( * ) Notice: Subject to any disclaimer, the term of this patent is extended or adjusted under 35 U.S.C. 154(b) by 318 days.

(21) Appl. No.: 15/887,572

(22) Filed: Feb. 2, 2018

(65) Prior Publication Data
US 2018/0230330 A1    Aug. 16, 2018

(30) Foreign Application Priority Data
Feb. 13, 2017    (JP) .............................. JP2017-024396

(51) Int. Cl.
*B32B 27/28* (2006.01)
*C09D 179/08* (2006.01)
*C08L 79/08* (2006.01)

(52) U.S. Cl.
CPC ............ *B32B 27/281* (2013.01); *C08L 79/08* (2013.01); *C09D 179/08* (2013.01)

(58) Field of Classification Search
CPC ................ B32B 27/281; C09D 179/08; C08G 73/1078; C08L 79/08
See application file for complete search history.

(56) References Cited

U.S. PATENT DOCUMENTS

| | | | | |
|---|---|---|---|---|
| 2012/0101213 A1* | 4/2012 | Tajiri | ................. | C08G 73/1039 524/538 |
| 2012/0142825 A1* | 6/2012 | Boussaad | ................. | C08L 1/02 524/39 |
| 2015/0091204 A1 | 4/2015 | Uekido | | |
| 2016/0307512 A1* | 10/2016 | Min | ..................... | H01L 51/0097 |
| 2018/0223045 A1* | 8/2018 | Noda | ..................... | C08G 73/10 |

FOREIGN PATENT DOCUMENTS

| | | | | |
|---|---|---|---|---|
| JP | 2006-169691 A | 6/2006 | | |
| JP | 2019-023249 A | 2/2019 | | |
| WO | WO 2010/150908 A1 | 12/2010 | | |
| WO | WO 2013/147009 A1 | 10/2013 | | |
| WO | WO-2014092126 A1 * | 6/2014 | ............. | C08L 1/288 |
| WO | WO-2015012368 A1 * | 1/2015 | ............. | C08L 79/08 |
| WO | WO-2017026448 A1 * | 2/2017 | ........... | C08K 5/3445 |

OTHER PUBLICATIONS

Machine translation of WO 2015/012368. (Year: 2015).*
Machine translation of WO 2014/092126. (Year: 2014).*
Notification of Reasons for Refusal issued in Japanese Patent Application No. 2017-024396, dated Sep. 1, 2020.

* cited by examiner

*Primary Examiner* — John D Freeman
(74) *Attorney, Agent, or Firm* — Knobbe Martens Olson & Bear LLP

(57) ABSTRACT

A resin composition resulting in a cured article which is excellent in balance among mechanical strength, surface smoothness, and light transmittance, a method for producing a cured article, a cured article, and a flexible substrate or flexible display including the cured article. The resin composition includes a polyamic acid having a structural unit represented by the following formula (1), a cellulose compound having a weight average molecular weight of 60,000 or less, and an organic solvent.

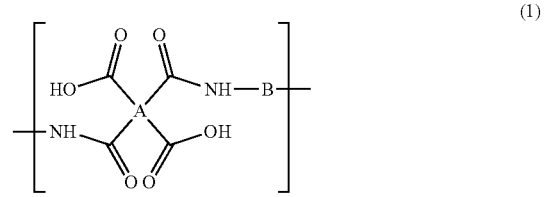

(1)

In the formula (1), A is a tetravalent organic group and B is a divalent organic group.

20 Claims, No Drawings

RESIN COMPOSITION, METHOD FOR PRODUCING CURED ARTICLE, CURED ARTICLE, FLEXIBLE SUBSTRATE, AND FLEXIBLE DISPLAY

RELATED APPLICATIONS

This application claims priority to Japanese Patent Application No. 2017-024396, filed Feb. 13, 2017, the entire content of which is incorporated herein by reference.

BACKGROUND OF THE INVENTION

Field of the Invention

The present invention relates to a resin composition suitable for a flexible substrate or a flexible display, a method for producing a cured article, and a cured article.

Related Art

Polyimide resins have properties such as excellent heat resistance, mechanical strength, insulation properties, and low dielectric constant. Therefore, polyimide resins have widely been used as insulating materials and protective materials in electric/electronic components, for example, various elements and electronic boards such as multilayer wiring boards. For example, Patent Document 1 discloses a polyimide resin film suitable for a solar battery substrate.

The polyimide resin film is excellent in flexibility and is suitable for a flexible substrate or a flexible display. When the polyimide resin film is applied to the flexible substrate or flexible display, not only the flexibility, but also high transmittance and surface smoothness are required.

Patent Document 1: PCT International Publication No. WO2013/147009

SUMMARY OF THE INVENTION

Preparation Example 2-2 of Patent Document 1 discloses, as a polyimide precursor solution, a system in which a cellulose acetate having a weight average molecular weight of about 150,000 is included. However, the present inventors have studied and found that, when such a cellulose compound having a high molecular weight is included in a solution containing a precursor of a polyimide, a cured article can attain the mechanical strength such as flexibility, but the surface smoothness and the light transmittance tend to be degraded. In light of the above problems of the prior art, an object of the present invention is to provide a resin composition which gives a cured article excellent in balance among the mechanical strength, the surface smoothness, and the light transmittance, a method for producing a cured article, and a cured article, and to provide a flexible substrate or flexible display including the cured article.

The present inventors have found that use of a resin composition including a polyamic acid and a cellulose compound having a specific weight average molecular weight enables giving a cured article which is excellent in balance among the mechanical strength, the surface smoothness, and the light transmittance, leading to completion of the present invention. Namely, the present invention is as follows.

A first aspect of the present invention is directed to a resin composition including a polyamic acid having a structural unit represented by the following formula (1), a cellulose compound having a weight average molecular weight of 60,000 or less, and an organic solvent:

[Formula 1]

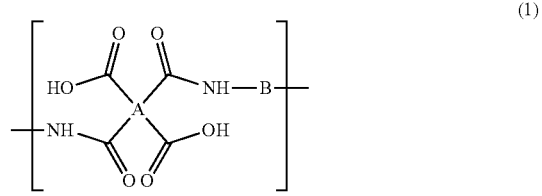

wherein, in the formula (1), A is a tetravalent organic group and B is a divalent organic group.

A second aspect of the present invention is directed to a method for producing a cured article, which includes a coating film formation step of coating the resin composition according to the first aspect on a base to form a coating film, and heating step of heating the coating film at 70 to 550° C.

A third aspect of the present invention is directed to a cured article obtained by curing the resin composition according to the first aspect. A fourth aspect of the present invention is directed to a flexible substrate including the cured article according to the third aspect. A fifth aspect of the present invention is directed to a flexible display including the cured article according to the third aspect.

The resin composition of the present invention can give a cured article which is excellent in balance among the mechanical strength, the surface smoothness, and the light transmittance. According to the present invention, it is possible to provide a method for producing a cured article using the resin composition, and a cured article, and to provide a flexible substrate or a flexible display including the cured article.

DETAILED DESCRIPTION OF THE INVENTION

Embodiments of the present invention will be described in detail below, but the present invention is not limited to the following embodiments and can be carried out by appropriately modifying within the object of the present invention. In the specification, a numerical range defined with "to" is meant to include the numbers preceeding and following the "to", unless otherwise specified.

<Resin Composition>

The resin composition according to the first aspect includes a polyamic acid having a structural unit represented by the formula (1), a cellulose compound having a weight average molecular weight of 60,000 or less, and an organic solvent. The reason why a cured article formed by using the resin composition according to the first aspect is excellent in balance among the mechanical strength, the surface smoothness, and the light transmittance is not known, but it seems that the cellulose compound has a molecular weight in a specific range, whereby, the solubility in the resin composition is improved, leading to an improvement of the transmittance, and the cellulose compound absorbs water molecules formed by a ring-closing reaction of the polyamic acid upon formation of a polyamide to reduce the surface roughness, resulting in an improvement of the surface smoothness.

[Polyamic Acid]

In the formula (1), A is a tetravalent organic group, and the number of carbon atoms of A is preferably 6 to 50, and more preferably 6 to 30. B is a divalent organic group, and the number of carbon atoms of B is preferably 2 to 50, more preferably 2 to 40, and still more preferably 6 to 40. A and B each may be an aliphatic group, an aromatic group, or a group in which these structures are used in combination. A and B may contain, in addition to a carbon atom and a hydrogen atom, a halogen atom, an oxygen atom, and a sulfur atom. When A and B contain an oxygen atom, a nitrogen atom, or a sulfur atom, the oxygen atom, the nitrogen atom, or the sulfur atom may be contained in A and B as a group selected from a nitrogen-containing heterocyclic group, —CONH—, —NH—, —N=N—, —CH=N—, —COO—, —O—, —CO—, —SO—, —SO$_2$—, —S—, and —S—S—, and more preferably included in A and B as a group selected from —O—, —CO—, —SO—, —SO$_2$—, —S—, and —S—S—.

When A in the formula (1) is an aliphatic group, A preferably contains an alicyclic group, and preferably contains at least one alicyclic group selected from the group consisting of monocyclic, bicyclo cyclic, tricyclo cyclic, tetracyclo cyclic, and spirocyclic groups. When A in the formula (1) is an aliphatic group, A is preferably represented by the following formula (2):

[Formula 2]

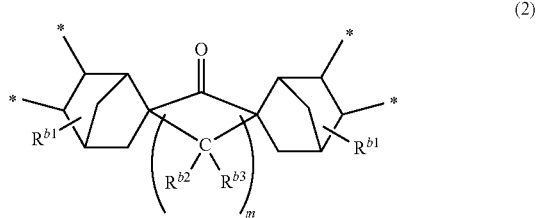

(2)

wherein, in the formula (2), $R^{b1}$, $R^{b2}$, and $R^{b3}$ each independently represent one selected from the group consisting of a hydrogen atom, an alkyl group, and a fluorine atom, m represents an integer of 0 to 12, and * represents a bond.

The alkyl group to be selectable as $R^{b1}$ in the formula (2) is preferably an alkyl group having 1 to 10 carbon atoms. Adjustment of the number of carbon atoms of the alkyl group in such range enables smooth proceeding of a reaction of converting into a polyimide from the polyamic acid. When $R^{b1}$ is an alkyl group, the number of carbon atoms thereof is preferably 1 to 6, more preferably 1 to 5, still more preferably 1 to 4, and particularly preferably 1 to 3, in view of easily obtaining a polyimide resin having excellent heat resistance. When $R^{b1}$ is an alkyl group, the alkyl group may be either linear or branched.

$R^{b1}$(s) in the formula (2) each independently is more preferably a hydrogen atom or an alkyl group having 1 to 10 carbon atoms since the thus obtained polyimide resin is excellent in heat resistance. In view of easy availability and purification of a tetracarboxylic dianhydride component, $R^{b1}$ in the formula (2) is more preferably a hydrogen atom, a methyl group, an ethyl group, an n-propyl group, or an isopropyl group, and particularly preferably a hydrogen atom or a methyl group. Plural $R^{b1}$(s) in the formula (2) are preferably the same groups since it is easy to purify the tetracarboxylic dianhydride component.

m in the formula (2) represents an integer of 0 to 12. Setting the value of m in this range enables easy purification of the tetracarboxylic dianhydride component. In view of more easily purifying the tetracarboxylic dianhydride component, the upper limit of m is preferably 5, and more preferably 3. In view of the chemical stability of the tetracarboxylic dianhydride component, the lower limit of m is preferably 1, and more preferably 2. m in the formula (2) is particularly preferably 2 or 3.

The alkyl group to be selectable as $R^{b2}$ and $R^{b3}$ in the formula (2) is the same as an alkyl group to be selectable as $R^{b1}$. In view of easy purification of the tetracarboxylic dianhydride component, $R^{b2}$ and $R^{b3}$ are preferably hydrogen atoms or alkyl groups having 1 to 10 carbon atoms (preferably 1 to 6, more preferably 1 to 5, still more preferably 1 to 4, and particularly preferably 1 to 3 carbon atoms), and particularly preferably hydrogen atoms or methyl groups.

When A in the formula (1) is an aromatic group, preferred specific examples thereof include a tetravalent benzene group (e.g., a 1,2,4,5-benzene group), a tetravalent biphenyl group (e.g., a 3,3',4,4'-biphenyl group, a 2,3,3',4'-biphenyl group, or a 2,2',6,6'-biphenyl group), a tetravalent benzophenone group (e.g., a 3,3',4,4'-benzophenone group), a tetravalent diphenyl ether group (e.g., a 3,3',4,4'-diphenyl ether group), and a tetravalent diphenyl sulfone group (e.g., a 3,3',4,4'-diphenyl sulfone group). Among these, a tetravalent benzene group (e.g., a 1,2,4,5-benzene group), a tetravalent biphenyl group (e.g., a 3,3',4,4'-biphenyl group), and a tetravalent diphenyl ether group (e.g., a 3,3',4,4'-diphenyl ether group) are preferable in view of the cost and easy availability.

The lower limit of the number of carbon atoms of the organic group as B in the formula (1) is preferably 2, and more preferably 6, and the upper limit is preferably 50, and more preferably 30. B may be an aliphatic group, but is preferably an organic group including one or more aromatic rings.

When B is an organic group including one or more aromatic rings, the organic group may be either one aromatic group itself, or a group in which two or more aromatic groups are bonded through an aliphatic hydrocarbon group and a halogenated aliphatic hydrocarbon group, or a bond containing heteroatoms such as an oxygen atom, a sulfur atom, and a nitrogen atom. Examples of the bond containing heteroatoms such as an oxygen atom, a sulfur atom, and a nitrogen atom, included in B, include —CONH—, —NH—, —N=N—, —CH=N—, —COO—, —O—, —CO—, —SO—, —SO$_2$—, —S—, and —S—S—, and —O—, —CO—, —SO—, —SO$_2$—, —S—, and —S—S— are preferable.

The aromatic ring to be bonded with a nitrogen atom in B is preferably a benzene ring. When the ring to be bonded with a nitrogen atom in B is a fused ring including two or more rings, the ring to be bonded with a nitrogen atom in the fused ring is preferably a benzene ring. The aromatic ring included in B may also be an aromatic heterocyclic ring.

When B is an organic group including an aromatic ring, in view of the heat resistance of a cured article formed using a resin composition, the organic group is preferably at least one of groups represented by the following formulas (3) to (6):

[Formula 3]

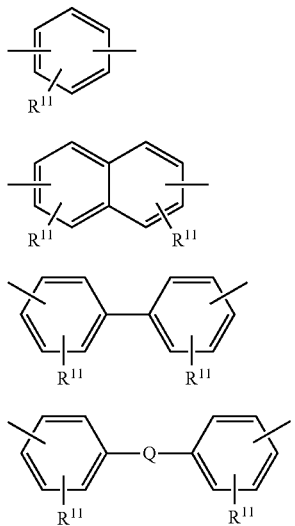

Wherein, in the formulas (3) to (6), $R^{11}$ represents one selected from the group consisting of a hydrogen atom, a fluorine atom, hydroxyl group, an alkyl group having 1 to 4 carbon atoms, and a halogenated alkyl group having 1 to 4 carbon atoms; in the formula (6), Q represents a 9,9′-fluorenylidene group, or one selected from the group consisting of groups represented by the formulas: —$C_6H_4$—, —CONH—$C_6H_4$—NHCO—, —NHCO—$C_6H_4$—CONH—, —O—$C_6H_4$—CO—$C_6H_4$—O—, —OCO—$C_6H_4$—COO—, —OCO—$C_6H_4$—$C_6H_4$—COO—, —OCO—, —O—, —S—, —CO—, —CONH—, —$SO_2$—, —$C(CF_3)_2$—, —$C(CH_3)_2$—, —$CH_2$—, —O—$C_6H_4$—$C(CH_3)_2$—$C_6H_4$—O—, —O—$C_6H_4$—$C(CF_3)_2$—$C_6H_4$—O—, —O—$C_6H_4$—$SO_2$—$C_6H_4$—O—, —$C(CH_3)_2$—$C_6H_4$—$C(CH_3)_2$—, —O—$C_{10}H_6$—O—, —O—$C_6H_4$—$C_6H_4$—O—, and —O—$C_6H_4$—O—; —$C_6H_4$— in the exemplification of Q is a phenylene group, preferably an m-phenylene group and a p-phenylene group, and more preferably a p-phenylene group; —$C_{10}H_6$— is a naphthalenediyl group, preferably a naphthalene-1,2-diyl group, a naphthalene-1,4-diyl group, a naphthalene-2,3-diyl group, a naphthalene-2,6-diyl group, and a naphthalene-2,7-diyl group, and more preferably a naphthalene-1,4-diyl group and a naphthalene-2,6-diyl group.

$R^{11}$ in the formulas (3) to (6) is more preferably a hydrogen atom, a hydroxyl group, a fluorine atom, a methyl group, an ethyl group, or a trifluoromethyl group, and particularly preferably a hydrogen atom, a hydroxyl group, or a trifluoromethyl group, from the viewpoint of the heat resistance of the cured article to be formed.

Q in the formula (6) is preferably a 9,9-fluorenylidene group, —O—$C_6H_4$—O—, —$C(CF_3)_2$—, —O—, —$C(CH_3)_2$—, —$CH_2$—, or —O—$C_6H_4$—$C(CH_3)_2$—$C_6H_4$—O—, or —CONH—, and particularly preferably —O—$C_6H_4$—O—, —$C(CF_3)_2$—, or —O—, in view of the heat resistance of the cured article to be formed.

It is possible to employ, as B, a silicon atom-containing group optionally having a chain aliphatic group and/or an aromatic ring. It is possible to typically use, as the silicon atom-containing group, groups shown below.

[Formula 4]

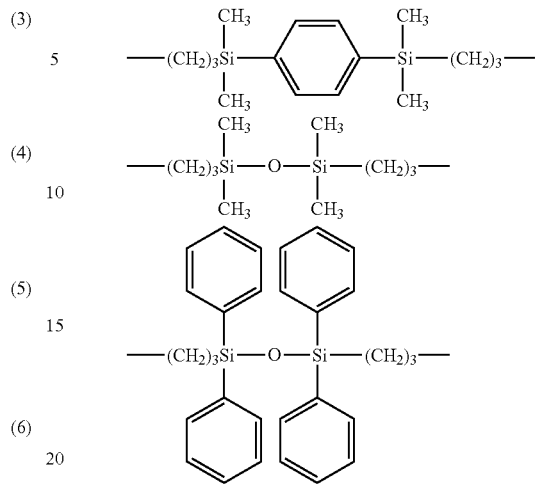

From the viewpoint of further improving the mechanical properties of the thus obtained cured article, it is also possible to preferably use as B a group represented by the following formula (Si-1):

[Formula 5]

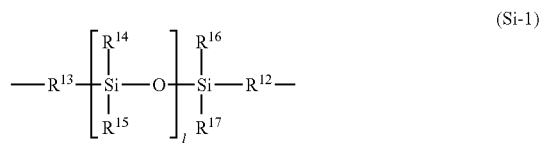

wherein, in the formula (Si-1), $R^{12}$ and $R^{13}$ each independently represent a single bond, a methylene group, an alkylene group having 2 to 20 carbon atoms, a cycloalkylene group having 3 to 20 carbon atoms, or an arylene group having 6 to 20 carbon atoms; $R^{14}$, $R^{15}$, $R^{16}$, and $R^{17}$ each independently represent an alkyl group having 1 to 20 carbon atoms, a cycloalkyl group having 3 to 20 carbon atoms, an aryl group having 6 to 20 carbon atoms, a group having an amino group having 20 or less carbon atoms, a group represented by —O—$R^{18}$ ($R^{18}$ is a hydrocarbon group having 1 to 20 carbon atoms), or an organic group which has an epoxy group having 2 to 20 carbon atoms; and 1 is an integer of 3 to 50.

The alkylene group having 2 to 20 carbon atoms as $R^{12}$ and $R^{13}$ in the formula (Si-1) is preferably an alkylene group having 2 to 10 carbon atoms from the viewpoint of the heat resistance and residual stress, and examples thereof include a dimethylene group, a trimethylene group, a tetramethylene group, a pentamethylene group, a hexamethylene group, and the like.

The cycloalkylene group having 3 to 20 carbon atoms as $R^{12}$ and $R^{13}$ in the formula (Si-1) is preferably a cycloalkylene group having 3 to 10 carbon atoms from the viewpoint of the heat resistance and residual stress, and examples thereof include a cyclobutylene group, a cyclopentylene group, a cyclohexylene group, a cycloheptylene group, and the like. The arylene group having 6 to 20 carbon atoms as $R^{12}$ and $R^{13}$ in the formula (Si-1) is preferably an aromatic group having 6 to 20 carbon atoms from the viewpoint of the heat resistance and residual stress, and examples thereof include a phenylene group, a naphthylene group, and the like.

The alkyl group having 1 to 20 carbon atoms as $R^{14}$, $R^{15}$, $R^{16}$, and $R^{17}$ in the formula (Si-1) is preferably an alkyl group having 1 to 10 carbon atoms from the viewpoint of the heat resistance and residual stress, and specific examples thereof include a methyl group, an ethyl group, a propyl group, an isopropyl group, a butyl group, an isobutyl group, a tert-butyl group, a pentyl group, a hexyl group, and the like. The cycloalkyl group having 3 to 20 carbon atoms as $R^{13}$, $R^{15}$, $R^{16}$, and $R^{17}$ in the formula (Si-1) is preferably a cycloalkyl group having 3 to 10 carbon atoms from the viewpoint of the heat resistance and residual stress, and specific examples thereof include a cyclopentyl group, a cyclohexyl group, and the like. The aryl group having 6 to 20 carbon atoms as $R^{14}$, $R^{15}$, $R^{16}$, and $R^{17}$ in the formula (Si-1) is preferably an aryl group having 6 to 12 carbon atoms from the viewpoint of the heat resistance and residual stress, and specific examples thereof include a phenyl group, a tolyl group, a naphthyl group, and the like. Examples of the group having an amino group having 20 or less carbon atoms as $R^{14}$, $R^{15}$, $R^{16}$, and $R^{17}$ in the formula (Si-1) include an amino group, a substituted amino group (e.g., bis(trialkylsilyl)amino group), and the like. Examples of a group represented by —O—$R^{18}$ as $R^{14}$, $R^{15}$, $R^{16}$, and $R^{17}$ in the formula (Si-1) include a methoxy group, an ethoxy group, a propoxy group, an isopropyloxy group, a butoxy group, a phenoxy group, a tolyloxy group, a naphthyloxy group, a propenyloxy group (e.g., allyloxy group), and a cyclohexyloxy group. Among these, $R^{14}$, $R^{15}$, $R^{16}$, and $R^{17}$ preferably represent a methyl group, an ethyl group, a propyl group, or a phenyl group.

The group represented by the formula (Si-1) can be introduced by reacting a silicon-containing compound having an amino group at both ends with an acid anhydride. Specific examples of the silicon-containing compound include both-end amino-modified methyl phenyl silicone (e.g, X-22-1660B-3 (number average molecular weight of about 4,400) and X-22-9409 (number average molecular weight of about 1,300) manufactured by Shin-Etsu Chemical Co., Ltd.), both-end amino-modified dimethyl silicone (e.g., X-22-161A (number average molecular weight of about 1,600), X-22-161B (number average molecular weight of about 3,000), and KF8012 (number average molecular weight of about 4,400) manufactured by Shin-Etsu Chemical Co., Ltd., BY16-835U (number average molecular weight of about 900) manufactured by Dow Corning Toray Co., Ltd.), and Silaplane FM3311 (number average molecular weight of about 1,000) manufactured by JNC Corporation).

(Preparation of Polyamic Acid)

The polyamic acid having a structural unit represented by the formula (1) is obtained by reacting a tetracarboxylic dianhydride with a diamine compound in a solvent. The tetracarboxylic dianhydride and diamine compound, which serve as synthetic raw materials of the polyamic acid are not particularly limited as long as they can form the polyamic acid by a reaction of an acid anhydride group with an amino group and give a predetermined structure.

When the polyamic acid is synthesized, each use amount of the tetracarboxylic dianhydride and diamine compound is not particularly limited, and the diamine compound is preferably used in the amount of 0.50 to 1.50 mol, more preferably 0.60 to 1.30 mol, and particularly preferably 0.70 to 1.20 mol, based on 1 mol of the tetracarboxylic dianhydride.

The tetracarboxylic dianhydride can be appropriately selected from tetracarboxylic dianhydrides which have conventionally been used as synthetic raw materials of the polyamic acid as long as it gives a predetermined structure. The tetracarboxylic dianhydride may be either an aliphatic tetracarboxylic dianhydride or an aromatic tetracarboxylic dianhydride. Two or more tetracarboxylic dianhydrides may be used in combination.

Suitable specific examples of the aliphatic tetracarboxylic dianhydride include aliphatic or alicyclic tetracarboxylic dianhydrides, such as butanetetracarboxylic dianhydride, 1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbornane-2-acetic dianhydride, 2,3,4,5-tetrahydrofurantetracarboxylic dianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 5-(2,5-dioxotetrahydrofuranyl)-3-methyl-3-cyclohexene-1,2-dicarboxylic dianhydride, bicyclo[2.2.2]-oct-7-ene-2,3,5,6-tetracarboxylic dianhydride, bicyclo[2.2.1]-heptane-2,3,5,6-tetracarboxylic dianhydride, (4H,8H)-decahydro-1,4:5,8-dimethanonaphthalene-2,3,6,7-tetracarboxylic dianhydride, and pentacyclo[9.2.1.1$^{4,7}$.0$^{2,10}$.0$^{3,8}$]-pentadecane-5,6,12,13-tetracarboxylic dianhydride. Suitable specific examples of the aliphatic tetracarboxylic dianhydride when A in the formula (1) is represented by the formula (2) include norbornane-2-spiro-α-cyclopentanone-α'-spiro-2"-norbornane-5,5",6,6"-tetracarboxylic dianhydride (another name "norbornane-2-spiro-2'-cyclopentanone-5'-spiro-2"-norbornane-5,5",6,6"-tetracarboxylic dianhydride"), methylnorbornane-2-spiro-α-cyclopentanone-α'-spiro-2"-(methylnorbornane)-5,5",6,6"-tetracarboxylic dianhydride, norbornane-2-spiro-α-cyclohexanone-α'-spiro-2"-norbornane-5,5",6,6"-tetracarboxylic dianhydride (another name "norbornane-2-spiro-2'-cyclohexanone-6'-spiro-2"-norbornane-5,5",6,6"-tetracarboxylic dianhydride"), methylnorbornane-2-spiro-α-cyclohexanone-α'-spiro-2"-(methylnorbornane)-5,5",6,6"-tetracarboxylic dianhydride, norbornane-2-spiro-α-cyclopropanone-α'-spiro-2"-norbornane-5,5",6,6"-tetracarboxylic dianhydride, norbornane-2-spiro-α-cyclobutanone-α'-spiro-2"-norbornane-5,5",6,6"-tetracarboxylic dianhydride, norbornane-2-spiro-α-cycloheptanone-α'-spiro-2"-norbornane-5,5",6,6"-tetracarboxylic dianhydride, norbornane-2-spiro-α-cyclooctanone-α'-spiro-2"-norbornane-5,5",6,6"-tetracarboxylic dianhydride, norbornane-2-spiro-α-cyclononanone-α'-spiro-2"-norbornane-5,5",6,6"-tetracarboxylic dianhydride, norbornane-2-spiro-α-cyclodecanone-α'-spiro-2"-norbornane-5,5",6,6"-tetracarboxylic dianhydride, norbornane-2-spiro-α-cycloundecanone-α'-spiro-2"-norbornane-5,5",6,6"-tetracarboxylic dianhydride, norbornane-2-spiro-α-cyclododecanone-α'-spiro-2"-norbornane-5,5",6,6"-tetracarboxylic dianhydride, norbornane-2-spiro-α-cyclotridecanone-α'-spiro-2"-norbornane-5,5",6,6"-tetracarboxylic dianhydride, norbornane-2-spiro-α-cyclotetradecanone-α'-spiro-2"-norbornane-5,5",6,6"-tetracarboxylic dianhydride, norbornane-2-spiro-α-cyclopentadecanone-α'-spiro-2"-norbornane-5,5",6,6"-tetracarboxylic dianhydride, norbornane-2-spiro-α-(methylcyclopentanone)-α'-spiro-2"-norbornane-5,5",6,6"-tetracarboxylic dianhydride, norbornane-2-spiro-α-

(methylcyclohexanone)-α'-spiro-2''-norbornane-5,5'',6,6''-tetracarboxylic dianhydride, and the like.

Preferred specific examples of the aromatic tetracarboxylic dianhydride include pyromellitic dianhydride, 3,3',4,4'-biphenyltetracarboxylic dianhydride, 2,3,3',4'-biphenyltetracarboxylic dianhydride, 3,3',4,4'-benzophenonetetracarboxylic dianhydride, 4,4'-oxydiphthalic dianhydride, 3,3',4,4'-diphenylsulfonetetracarboxylic dianhydride, and the like. Among these, 3,3',4,4'-biphenyltetracarboxylic dianhydride and pyromellitic dianhydride are preferable in view of the cost and easy availability.

The diamine compound can be appropriately selected from diamines which have conventionally been used as synthetic raw materials of the polyamic acid as long as it gives a predetermined structure. The diamine compound may be either an aromatic diamine or an aliphatic diamine, and is preferably an aromatic diamine in view of the heat resistance of the thus obtained polyimide resin. Two or more diamine compounds may be used in combination. The diamine compound is preferably represented by the following formula (7). These diamine compounds can be used alone, or two or more diamine compounds can be used in combination:

$$H_2N-B-NH_2 \quad (7)$$

wherein B is the same as B defined in the formula (1).

B in the formula (7) is preferably at least one of groups represented by the following formulas (8) to (11):

[Formula 6]

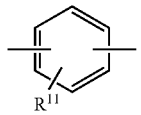
(8)

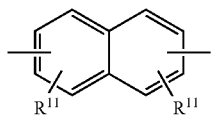
(9)

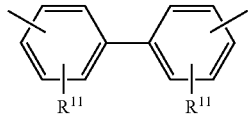
(10)

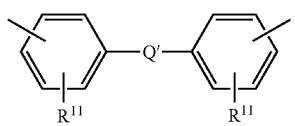
(11)

wherein, in the formula (8) to (11), $R^{11}$ represents one selected from the group consisting of a hydrogen atom, a fluorine atom, a chlorine atom, a bromine atom, a hydroxyl group, an alkyl group having 1 to 5 carbon atoms, and a fluorinated alkyl group having 1 to 5 carbon atoms and, in the formula (11), Q' represents a 9,9-fluorenylidene group, or one selected from the group consisting of groups represented by the formulas: —$C_6H_4$—, —O—$C_6H_4$—CO—$C_6H_4$—O—, —O—, —S—, —CO—, —C(CF$_3$)$_2$—, —C(CH$_3$)$_2$—, —CH$_2$—, —O—$C_6H_4$—C(CH$_3$)$_2$—$C_6H_4$—O—, —O—$C_6H_4$—C(CF$_3$)$_2$—$C_6H_4$—O—, —C(CH$_3$)$_2$—$C_6H_4$—C(CH$_3$)$_2$—, —O—$C_6H_4$—$C_6H_4$—O—, and —O—$C_6H_4$—O—. In the description of definition of the formulas (8) to (11), the group represented by —$C_6H_4$— may be an o-phenylene group, a m-phenylene group, or a p-phenylene group, and is preferably a m-phenylene group and a p-phenylene group, and more preferably a p-phenylene group.

From the viewpoint of the heat resistance of the thus obtained polyimide resin, $R^{11}$ in the formula (8) to (11) is preferably a hydrogen atom, a fluorine atom, a methyl group, an ethyl group, or a trifluoromethyl group, and more preferably a trifluoromethyl group.

From the viewpoint of balance between the heat resistance and the solubility in solvent of the thus obtained polyimide resin, Q' in the formula (11) is preferably a 9,9-fluorenylidene group, —$C_6H_4$—, —O—$C_6H_4$—O—, —O—, —C(CH$_3$)$_2$—, —CH$_2$—, or —O—$C_6H_4$—C(CH$_3$)$_2$—$C_6H_4$—O—, and particularly preferably —O—$C_6H_4$—O— or —O—.

Preferred specific examples of the compound represented by the formula (7) include 4,4'-diaminodiphenylmethane, 3,3'-diaminodiphenylmethane, 4,4'-diaminodiphenylethane, 3,3'-diaminodiphenylethane, 4,4'-diaminobiphenyl, 3,3'-diaminobiphenyl, 4,4'-diaminodiphenylether, 3,3'-diaminodiphenylether, 2,2-bis(4-aminophenoxyphenyl)propane, 1,3-bis(4-aminophenoxy)benzene, 1,3-bis(3-aminophenoxy)benzene, 2,2'-bis(trifluoromethyl)-4,4'-diaminobiphenyl, 3,4'-diaminodiphenylether, 4,4'-diaminobenzophenone, 3,3'-diaminobenzophenone, 9,9-bis(4-aminophenyl)fluorene, 9,9-bis(4-amino-3-methylphenyl)fluorene, 9,9-bis(4-amino-3-chlorophenyl)fluorene, 9,9-bis(4-amino-3-fluorophenyl)fluorene, p-diaminobenzene, m-diaminobenzene, o-diaminobenzene, 4,4'-diaminobiphenyl, 3,3'-diaminobiphenyl, 2,2'-diaminobiphenyl, 3,4'-diaminobiphenyl, 2,6-diaminonaphthalene, 1,4-diaminonaphthalene, 1,5-diaminonaphthalene, 4,4'-[1,3-phenylenebis(1-methyl-ethylidene)]bisaniline, 4,4'-[1,4-phenylenebis(1-methyl-ethylidene)]bisaniline, 2,2'-dimethyl-4,4'-diaminobiphenyl, 3,3'-dimethyl-4,4'-diaminobiphenyl, 4,4'-diaminodiphenylsulfide, 1,4-bis(4-aminophenoxy)benzene, 4,4'-bis(4-aminophenoxy)biphenyl, 1,3'-bis(4-aminophenoxy)-2,2-dimethylpropane, 2,2-bis[4-(4-aminophenoxy)phenyl]hexafluoropropane, 2,2-bis(3-amino-4-hydroxyphenyl)-hexafluoropropane, 2,2-bis(3-amino-4-methylphenyl)-hexafluoropropane, 2,2-bis(4-aminophenyl)-hexafluoropropane, 2,3,5,6-tetramethyl-1,4-phenylenediamine, 3,3',5,5'-tetramethylbenzidine, 1,5-bis(4-aminophenoxy)pentane, 4,4''-diamino-p-terphenyl, bis[4-(4-aminophenoxy)phenyl]ketone, and the like.

It is also possible to preferably use, as the diamine compound, a compound represented by the following formula (b1a) and a compound represented by the formula (b1b):

[Formula 7]

$$H_2N-R^{F11}-Z^b-R^{F10}-Z^b-R^{F12}-NH_2 \quad (b1a)$$

wherein, in the formula (b1a), $R^{F10}$ to $R^{F12}$ are optionally substituted divalent hydrocarbon groups, and $Z^b$ is independently a sulfone bond, a carboxylic acid ester bond, or a carboxylic acid amide bond, and

[Formula 8]

$$H_2N-R^{F13}-Z^b-R^{F14}-NH_2 \quad (b1b)$$

wherein, in the formula (b1b), $R^{F13}$ and $R^{F14}$ are optionally substituted divalent hydrocarbon groups, and $Z^b$ is independently a sulfone bond, a carboxylic acid ester bond, or a carboxylic acid amide bond.

The compound represented by the formula (b1a) is preferably a compound represented by the following formula (b1-1):

[Formula 9]

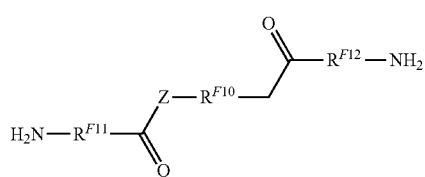

(b1-1)

wherein, in the formula (b1-1), $R^{F10}$ to $R^{F12}$ are optionally substituted divalent hydrocarbon groups, and Z is independently an oxygen atom or NH. The compound represented by the formula (b1b) is preferably a compound represented by the following formula (b1-2):

[Formula 10]

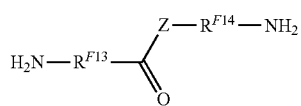

(b1-2)

wherein, in the formula (b1-2), $R^{F13}$ and $R^{F14}$ are optionally substituted divalent hydrocarbon groups, and Z is an oxygen atom or NH.

$R^{F10}$ to $R^{F14}$ in the formula (b1a), the formula (b1b), the formula (b1-1), and the formula (b1-2) are optionally substituted divalent hydrocarbon groups. From the viewpoint of balance between the heat resistance and the solubility in solvent of the thus obtained polyimide resin, $R^{F10}$ to $R^{F14}$ are preferably each independently at least one of groups represented by the following formulas (b3) to (b6):

[Formula 11]

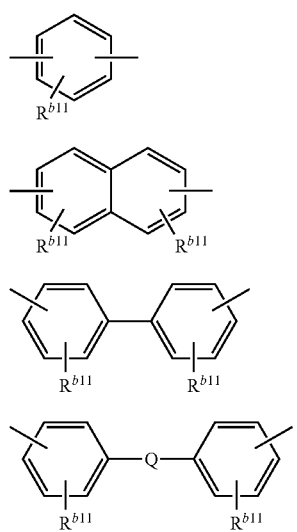

wherein, in the formulas (b3) to (b6), $R^{b11}$ represents one selected from the group consisting of a hydrogen atom, a fluorine atom, a chlorine atom, a bromine atom, a hydroxyl group, an alkyl group having 1 to 5 carbon atoms, and a fluorinated alkyl group having 1 to 5 carbon atoms and, in the formula (b6), Q represents a 9,9-fluorenylidene group, or one selected from the group consisting of the formulas: $-C_6H_4-$, $-CONH-C_6H_4-NHCO-$, $-NHCO-C_6H_4-CONH-$, $-O-C_6H_4-CO-C_6H_4-O-$, $-OCO-C_6H_4-COO-$, $-OCO-C_6H_4-C_6H_4-COO-$, $-OCO-$, $-O-$, $-S-$, $-CO-$, $-CONH-$, $-SO_2-$, $-C(CF_3)_2-$, $-C(CH_3)_2-$, $-CH_2-$, $-O-C_6H_4-C(CH_3)_2-C_6H_4-O-$, $-O-C_6H_4-C(CF_3)_2-C_6H_4-O-$, $-O-C_6H_4-SO_2-C_6H_4-O-$, $-C(CH_3)_2-C_6H_4-C(CH_3)_2-$, $-O-C_6H_4-C_6H_4-O-$, and $-O-C_6H_4-O-$. In the description in definition of the formulas (b3) to (b6), the group represented by $-C_6H_4-$ may be an o-phenylene group, a m-phenylene group, or a p-phenylene group, and preferably a m-phenylene group and a p-phenylene group, and more preferably a p-phenylene group.

From the viewpoint of the heat resistance of the thus obtained polyimide resin, $R^{b11}$ in the formulas (b3) to (b6) is preferably a hydrogen atom, a fluorine atom, a methyl group, an ethyl group, or a trifluoromethyl group, and more preferably a trifluoromethyl group.

From the viewpoint of balance between the heat resistance and the solubility in solvent of the thus obtained polyimide resin, Q in the formula (b6) is preferably a 9,9-fluorenylidene group, $-C_6H_4-$, $-O-C_6H_4-O-$, $-O-$, $-C(CH_3)_2-$, $-CH_2-$, $-O-C_6H_4-C(CH_3)_2-C_6H_4-O-$, or $-CONH-$, and particularly preferably $-O-C_6H_4-O-$ or $-O-$.

Among the groups represented by the formulas (b3) to (b6), a group represented by the formula (b5) or the formula (b6) is more preferable, and a group represented by the formula (b6) is particularly preferable, in view of easily obtaining a polyimide resin having more excellent heat resistance.

$R^{F10}$ to $R^{F14}$ are preferably groups represented by the following formulas.

[Formula 12]

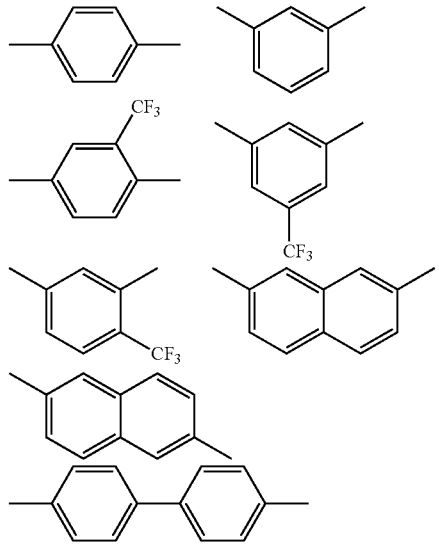

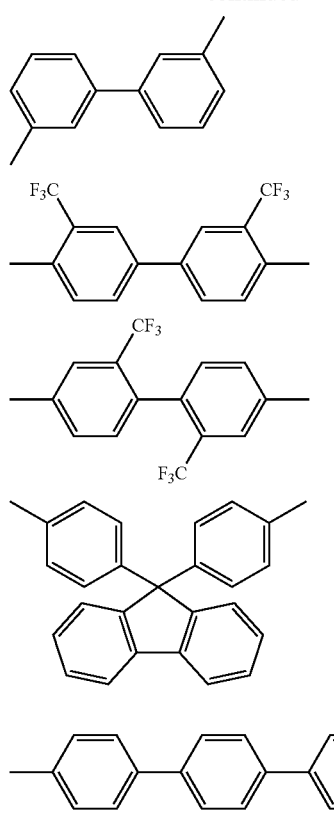
Among the above groups, $R^{F10}$ to $R^{F14}$ are more preferably groups represented by the following formulas.
[Formula 13]
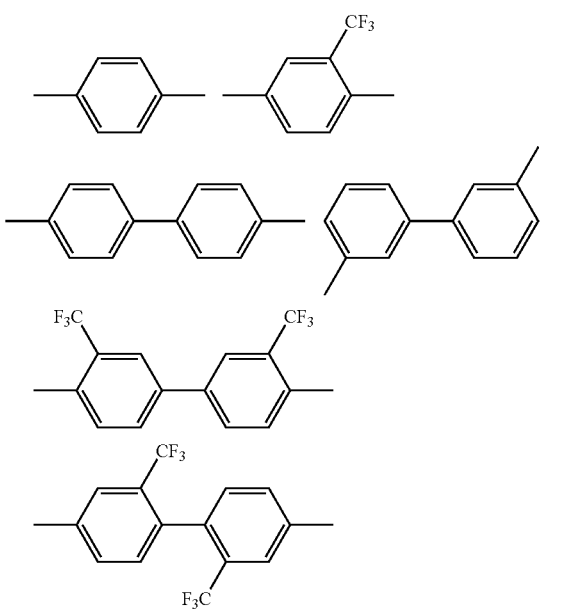
Among the above groups, $R^{F11}$, $R^{F12}$, and $R^{F13}$ are particularly preferably groups represented by the following formulas.
[Formula 14]
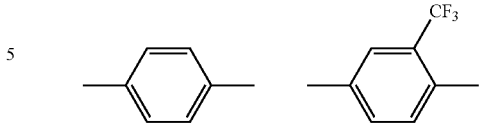
Suitable examples of the compound represented by the formula (b1a) include the following compounds.
[Formula 15]
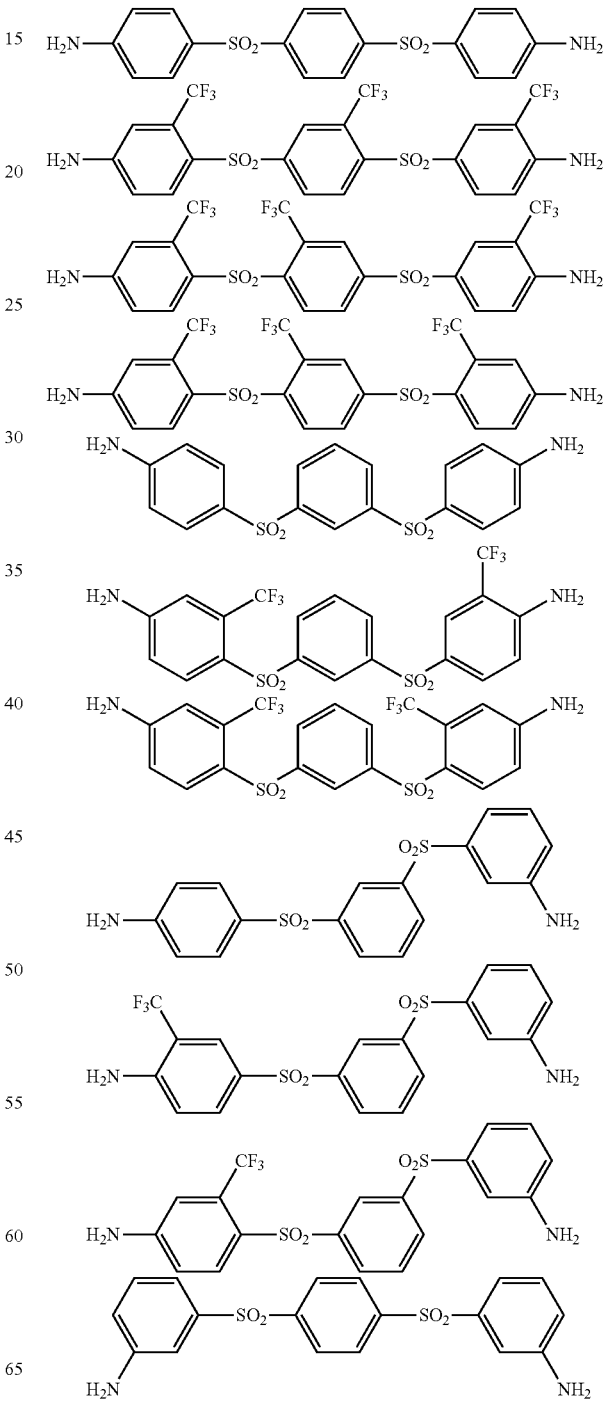

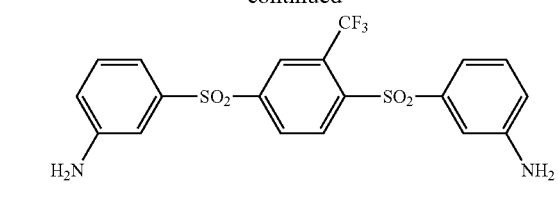
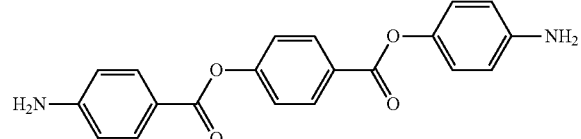
[Formula 16]
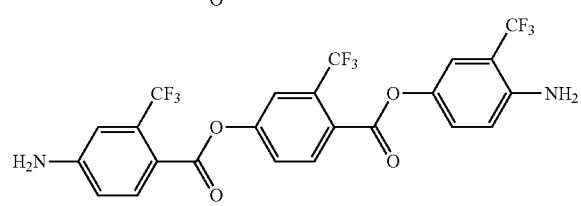
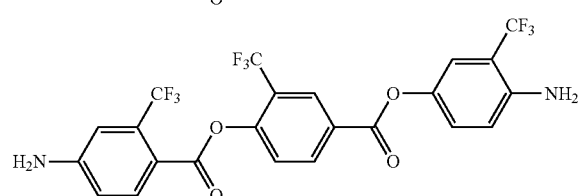
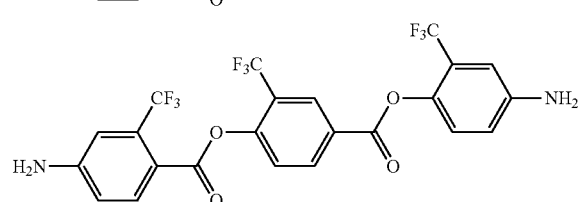
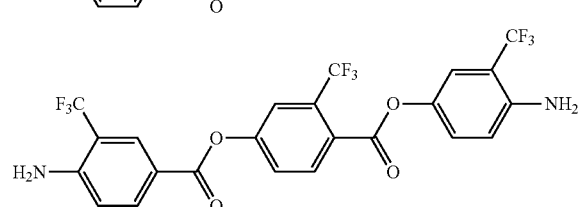
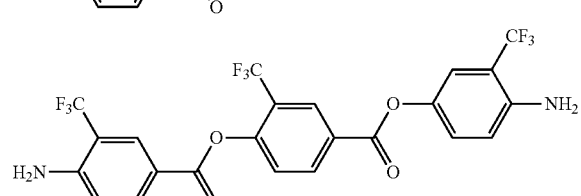
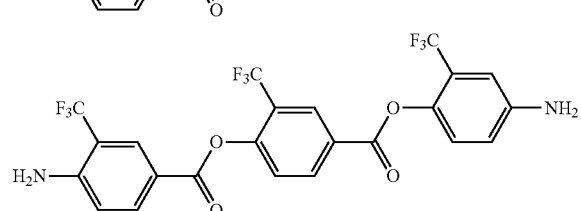
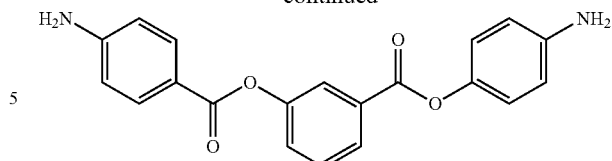
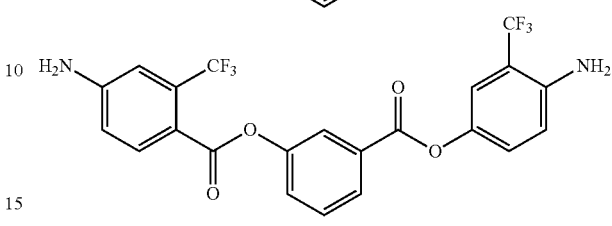
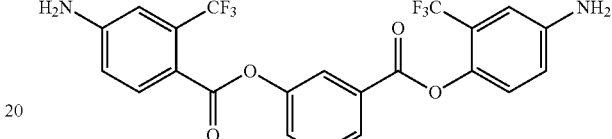
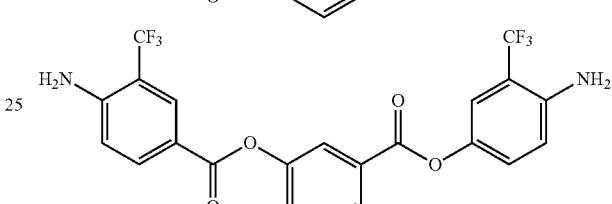
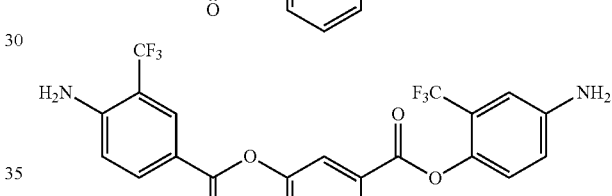
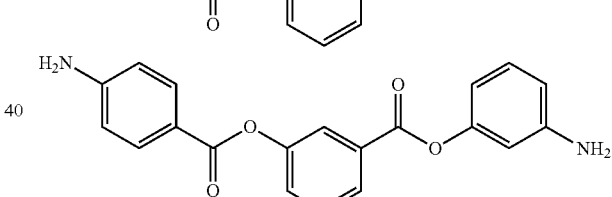
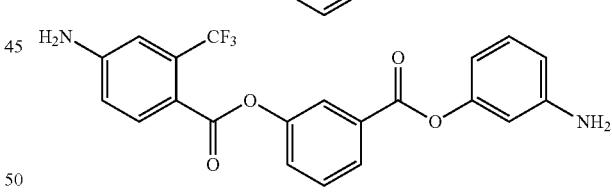
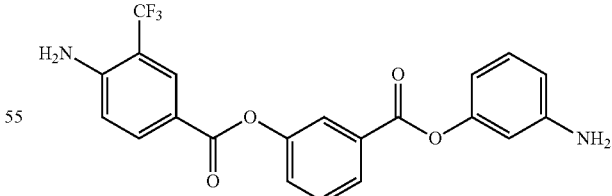
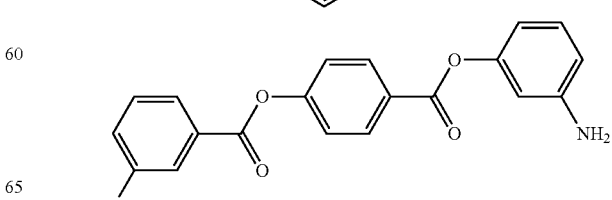

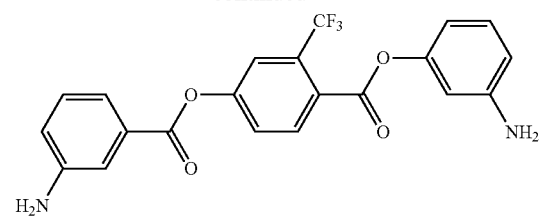
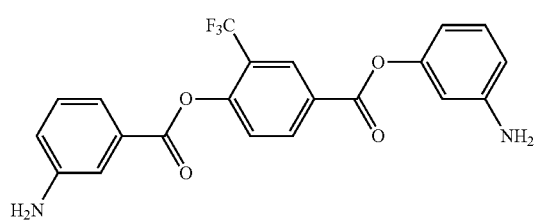
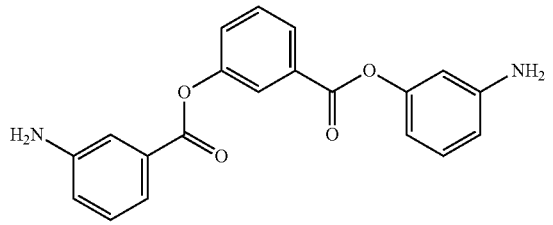
[Formula 17]
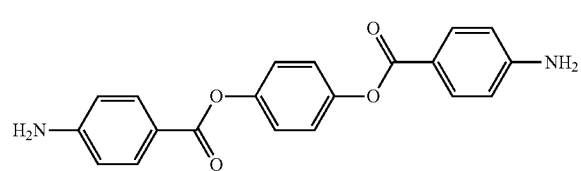
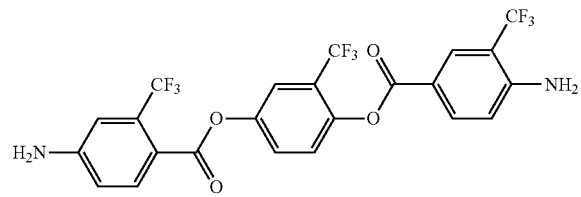
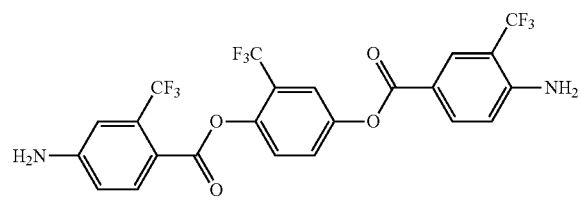
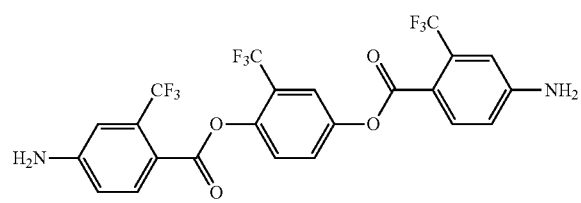
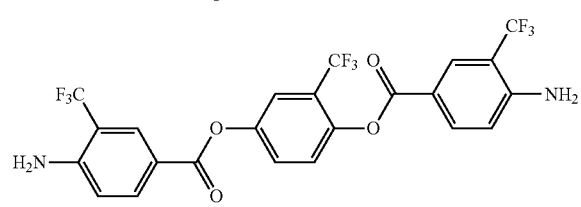
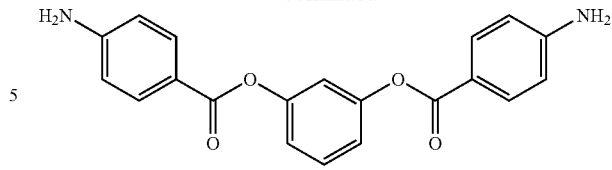
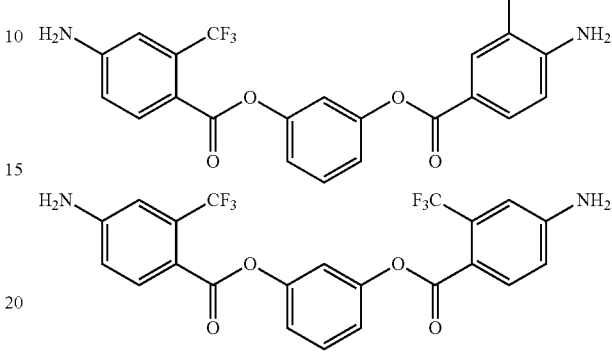
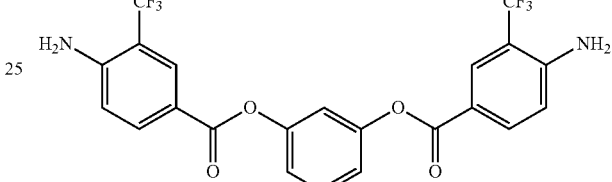
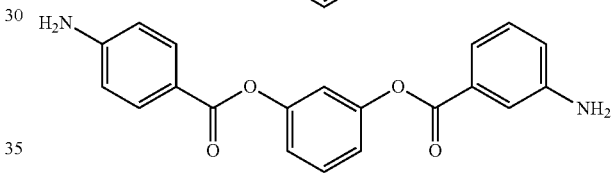
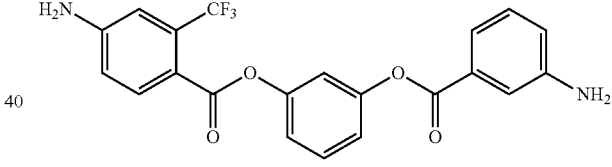
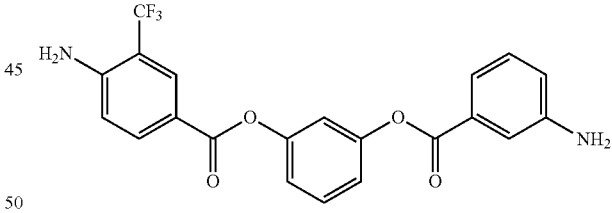
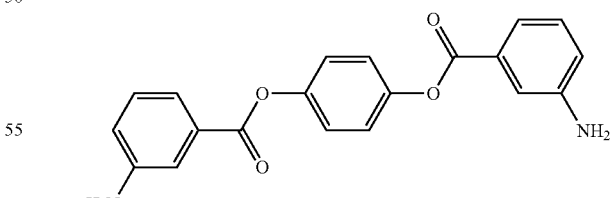
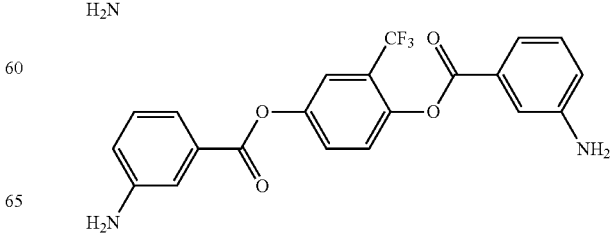

-continued
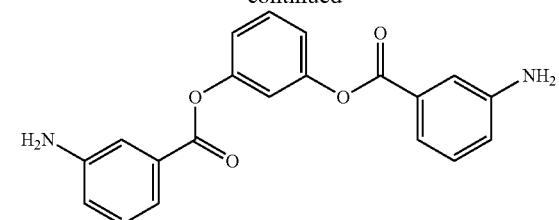
[Formula 18]
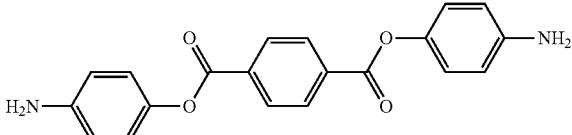
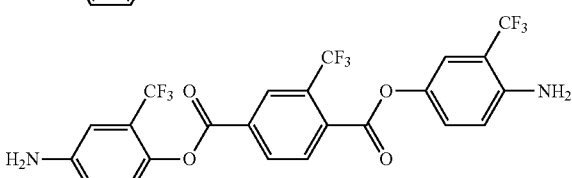
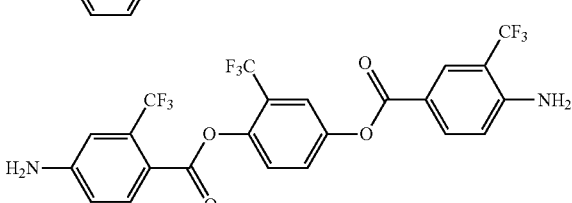
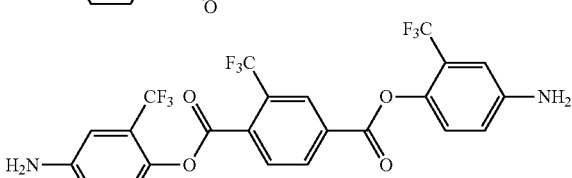
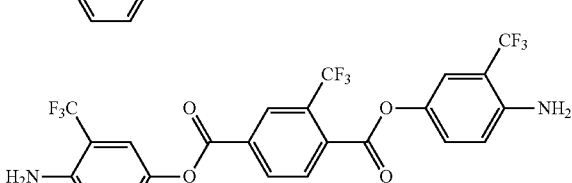
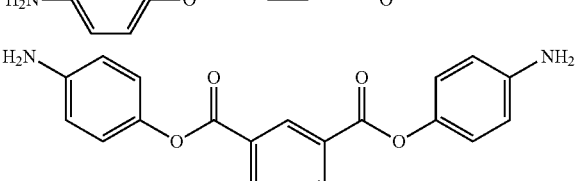
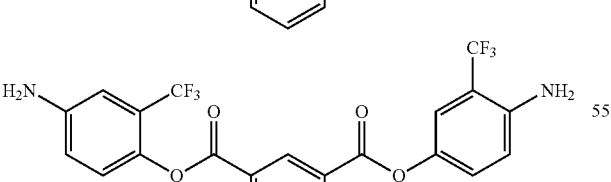
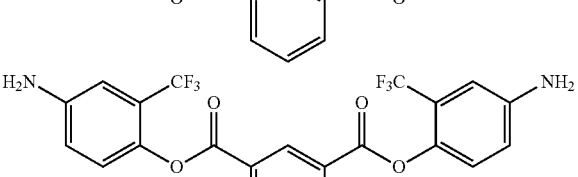
-continued
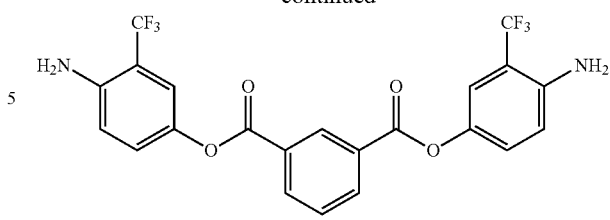
[Formula 19]
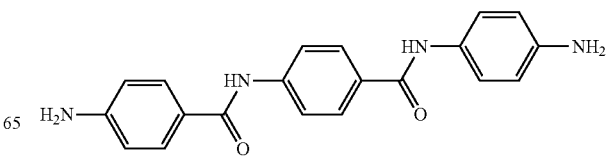

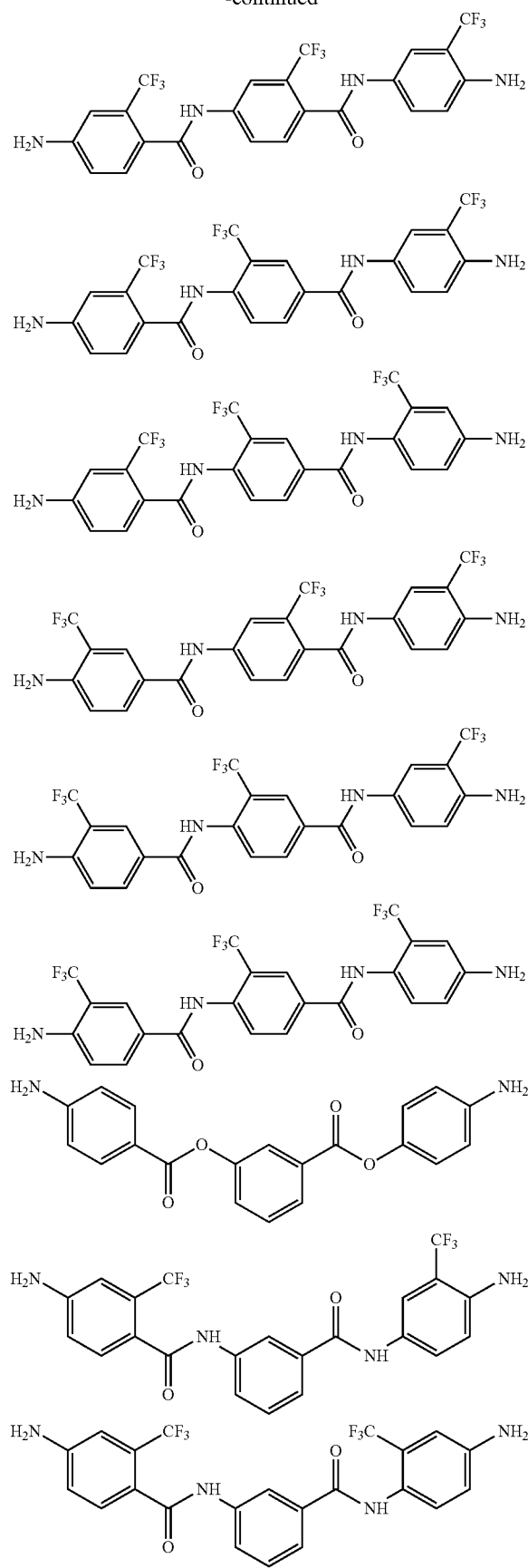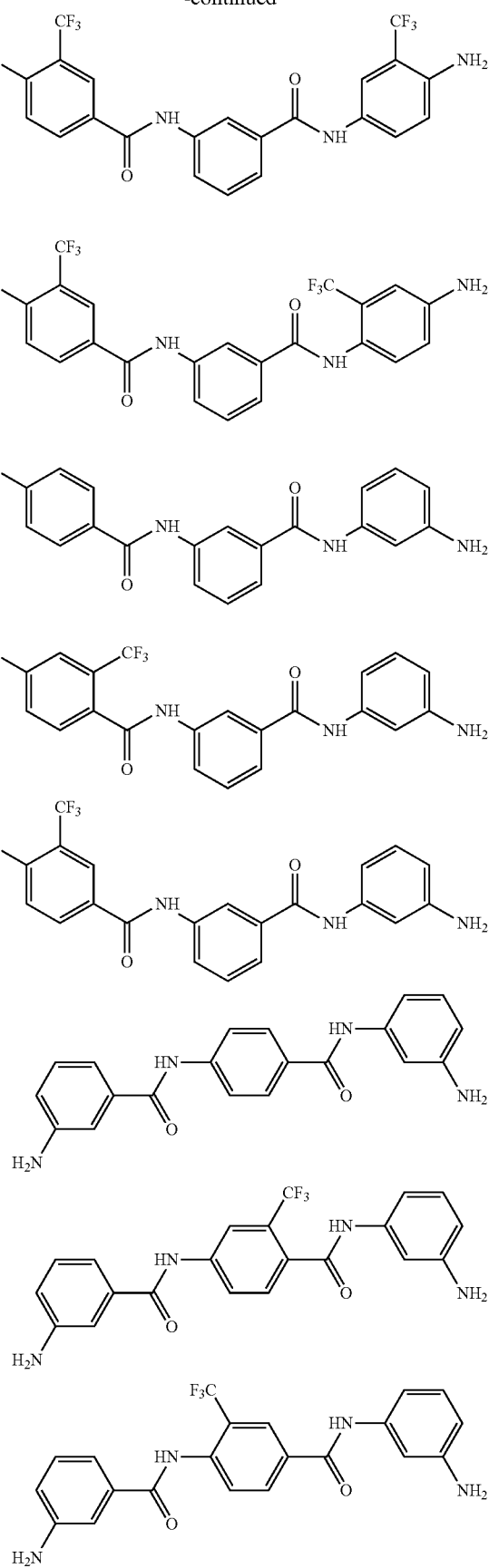

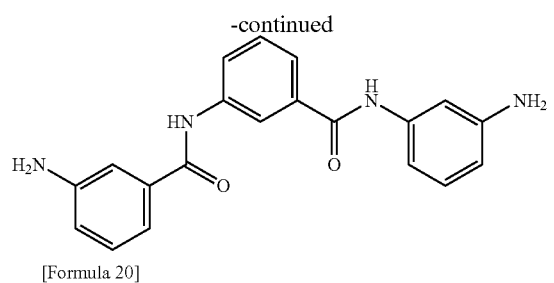
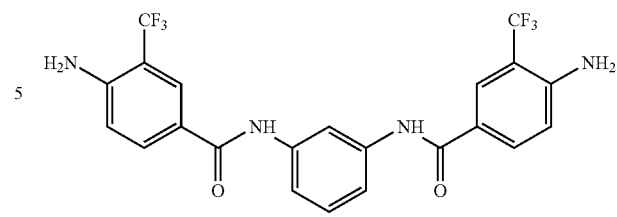
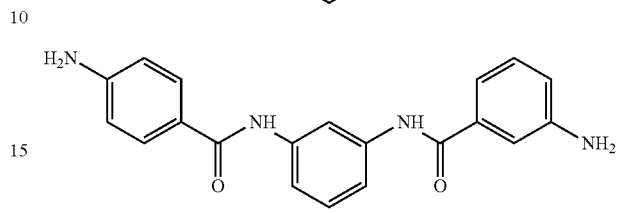
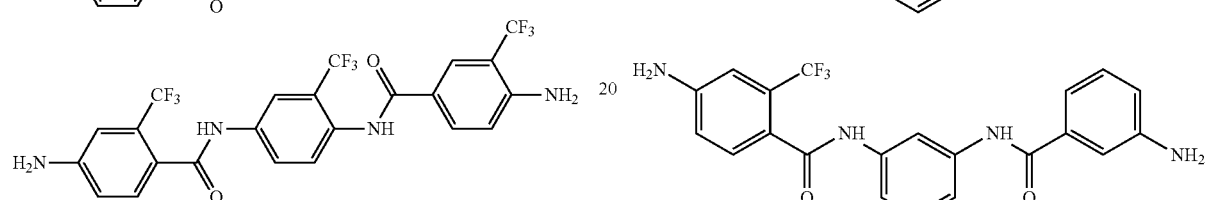
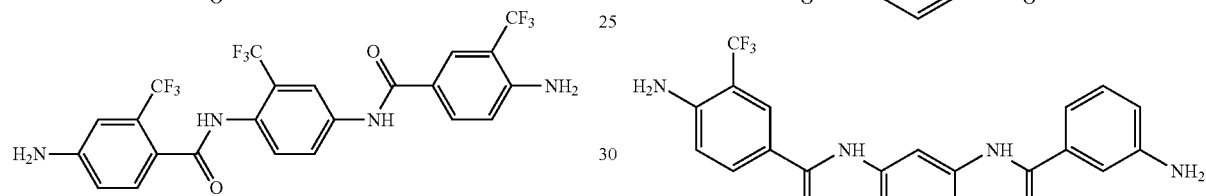
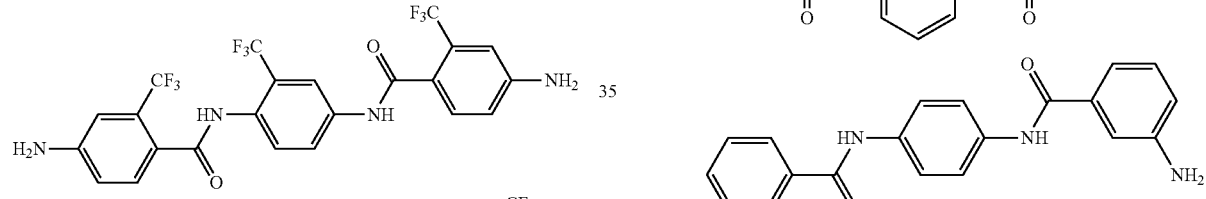
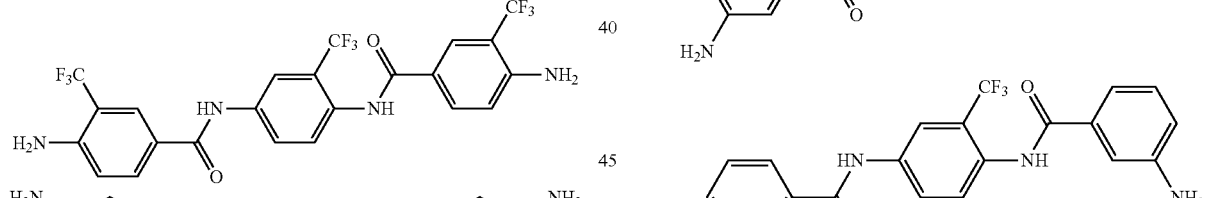
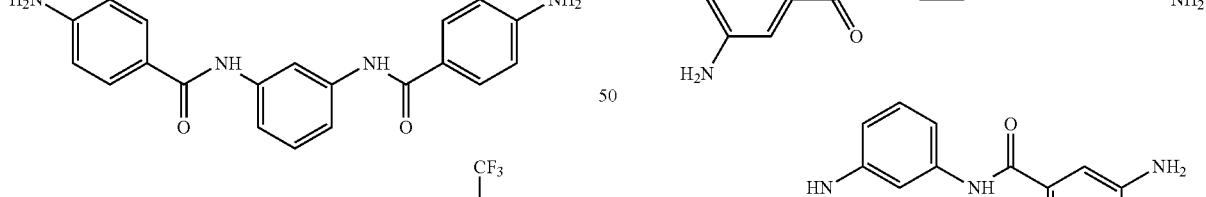
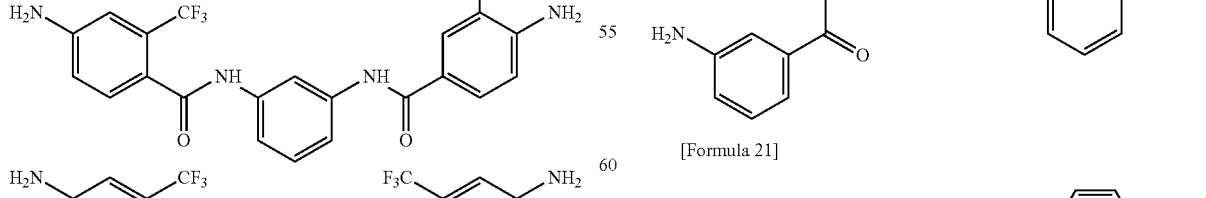
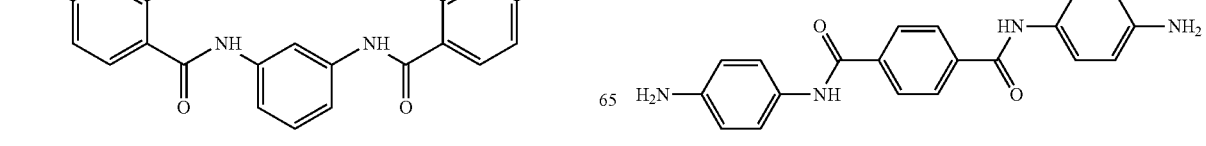
[Formula 20]
[Formula 21]

-continued
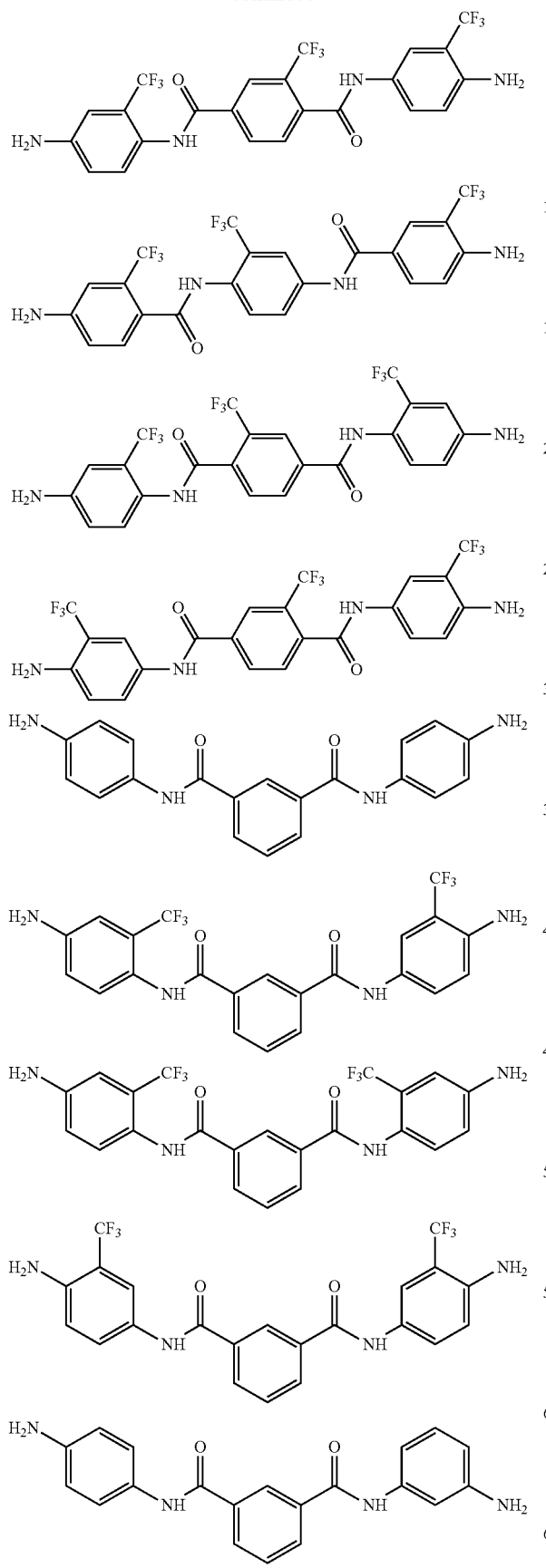
-continued
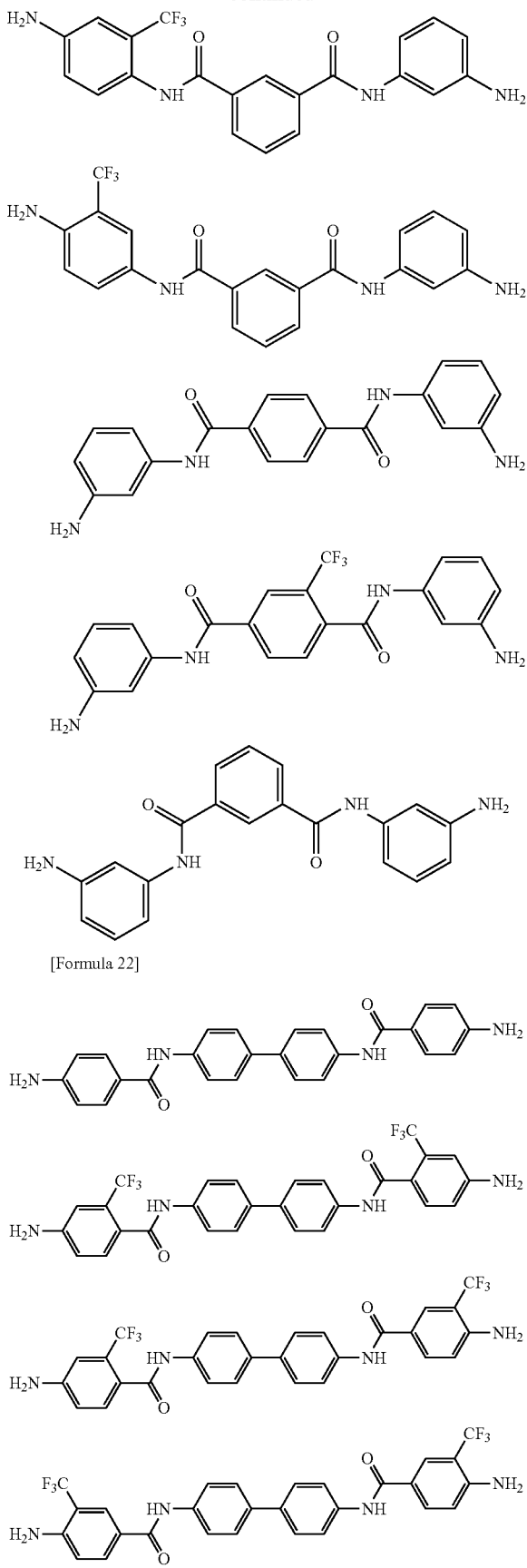
[Formula 22]

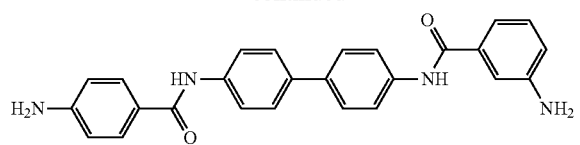
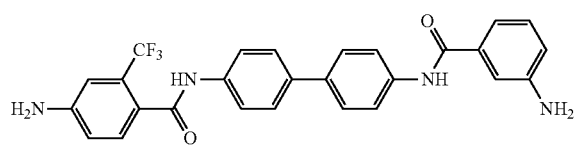
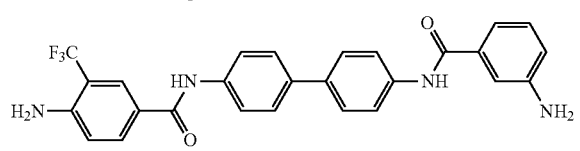
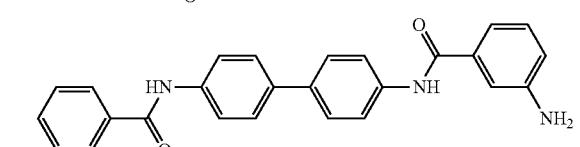
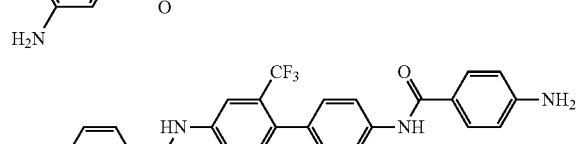
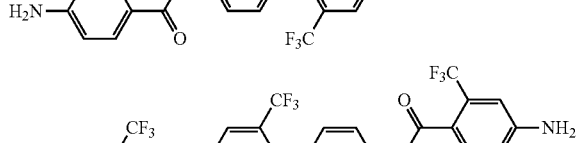
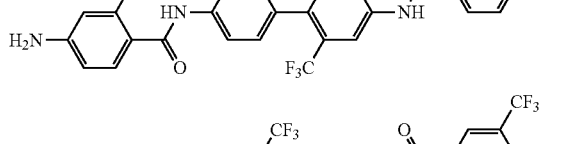
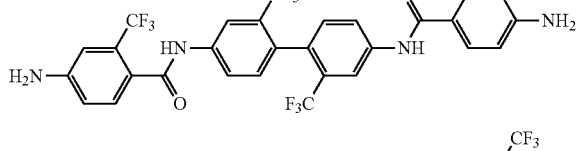
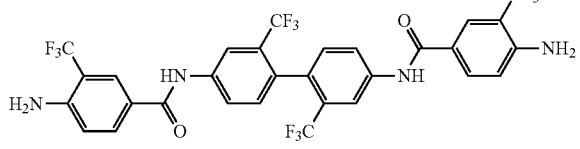
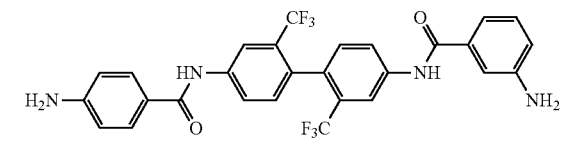
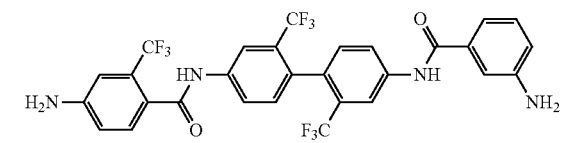
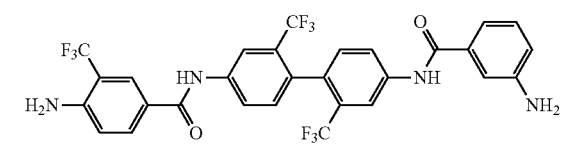
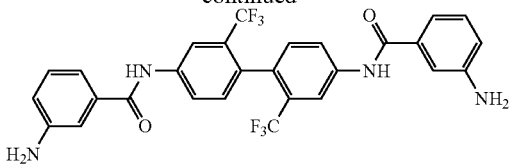
Suitable examples of the compound represented by the formula (b1b) Include the following compounds.
[Formula 23]

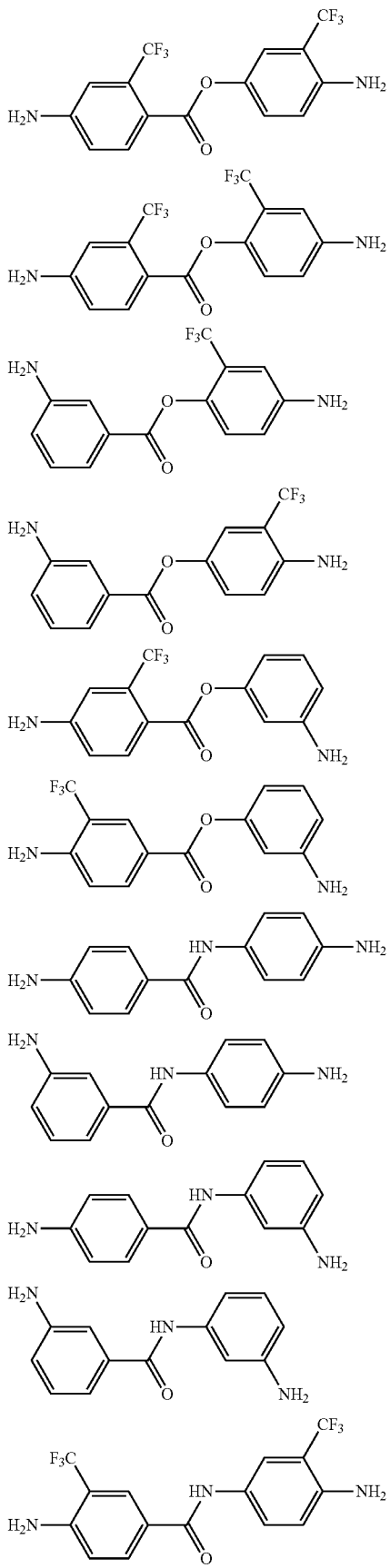

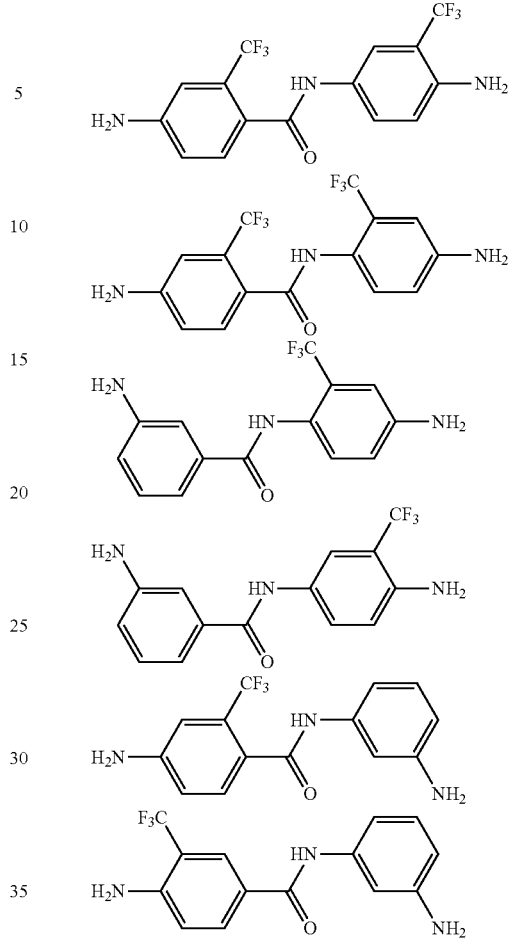

A reaction of a tetracarboxylic dianhydride with a diamine compound is usually performed in an organic solvent. The organic solvent to be used in the reaction of a tetracarboxylic dianhydride with a diamine compound is not particularly limited as long as it can dissolve the tetracarboxylic dianhydride and the diamine compound, and does not react with the tetracarboxylic dianhydride and a diamine. These organic solvents can be used alone, or two or more solvents can be used in combination.

Examples of the organic solvent to be used in a reaction of the tetracarboxylic dianhydride with the diamine compound include nitrogen-containing polar solvents such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone-based polar solvents such as β-propiolactone, γ-butyrolactone, γ-valerolactone, δ-valerolactone, γ-caprolactone, and ε-caprolactone; dimethyl sulfoxide; acetonitrile; fatty acid esters such as ethyl lactate and butyl lactate; and ethers such as diethylene glycol dimethyl ether, diethylene glycol diethyl ether, dioxane, tetrahydrofuran, methyl cellosolve acetate, and ethyl cellosolve acetate.

Among these organic solvents, preferred are nitrogen-containing polar solvents such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea in view of the solubility of the thus formed polyamic acid or the polyimide resin.

A weight average molecular weight of the polyamic acid obtained in the present embodiment can be appropriately set according to curing conditions, use applications of the polyimide resin, and the like and is, for example, 5,000 or more, preferably 7,500 or more, and more preferably 10,000 or more. Meanwhile, the weight average molecular weight of the polyamic acid is, for example, 100,000 or less, preferably 80,000 or less, and more preferably 75,000 or less. This weight average molecular weight may be set in the above range by adjusting the reaction conditions such as amounts of the tetracarboxylic dianhydride and the diamine compound, solvents, and reaction temperatures.

(Polyimide Resin)

By heating the polyamic acid having a structural unit represented by the formula (1), a polyimide resin having a structural unit represented by the following formula (12) can be obtained. Upon heating, catalysts for promoting curing may be appropriately added:

[Formula 24]

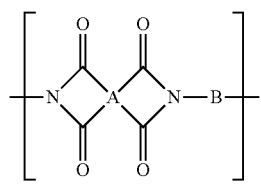

(12)

wherein, in the formula (12), A and B are the same as those defined in the formula (1).

The weight average molecular weight of the polyimide resin having a structural unit represented by the formula (12) can be appropriately set according to use applications of the polyimide resin, and the like and is, for example, 5,000 or more, preferably 7,500 or more, and more preferably 10,000 or more. Meanwhile, the weight average molecular weight of the polyimide resin having a structural unit represented by the formula (12) is, for example, 100,000 or less, preferably 80,000 or less, and more preferably 75,000 or less. This weight average molecular weight may be set in the above range by adjusting the reaction conditions in the case of obtaining the above-mentioned polyamic acid, such as amounts of the tetracarboxylic dianhydride and the diamine compound, solvents, and reaction temperatures.

[Cellulose Compound]

A cellulose compound included in the resin composition according to the first aspect has a weight average molecular weight of 60,000 or less, and the weight average molecular weight is preferably 50,000 or less, and more preferably 45,000 or less. As used herein, a mass average molecular weight (Mw) is a value in terms of polystyrene measured by gel permeation chromatography (GPC). When the weight average molecular weight is in the above range, the solubility of the cellulose compound in the resin composition is improved, thus enabling reduction of the surface roughness of the thus formed cured article without impairing the transmittance of the cured article, leading to improvement of the surface smoothness. The lower limit of the weight average molecular weight is not particularly limited as long as the effect of the present invention is not impaired, and is 1,000 or more, preferably 3,000 or more, and more preferably 10,000 or more.

The cellulose compound includes, for example, a cellulose compound in which hydroxyl groups possessed by the cellulose are at least partially substituted with an optional group such as a hydroxyalkoxy group (preferably a hydroxyalkoxy group having 1 to 10 carbon atoms, more preferably a hydroxyalkoxy group having 2 to 5 carbon atoms, and still more preferably a hydroxyalkoxy group having 2 to 4 carbon atoms), an alkoxy group (preferably an alkoxy group having 1 to 10 carbon atoms, more preferably an alkoxy group having 1 to 5 carbon atoms, and still more preferably an alkoxy group having 2 to 4 carbon atoms), or an acyloxy group (preferably an acyloxy group having 1 to 10 carbon atoms, more preferably an acyloxy group having 1 to 5 carbon atoms, and still more preferably an acyloxy group having 2 to 4 carbon atoms). The cellulose compound is preferably a hydroxyalkyl cellulose in which hydroxyl groups possessed by the cellulose are at least partially substituted with a hydroxyalkoxy group, more preferably a hydroxyalkyl cellulose in which at least 40% or more of hydroxyl groups possessed by the cellulose are substituted with a hydroxyalkoxy group, and still more preferably a hydroxyalkyl cellulose in which at least 50 to 80% of hydroxyl groups possessed by the cellulose are substituted with a hydroxyalkoxy group. The hydroxyalkyl cellulose is preferably a hydroxypropyl cellulose. Examples of a commercially available hydroxypropyl cellulose include CELNY (registered trademark) SSL (manufactured by NISSO HPC).

The lower limit of the content of the cellulose compound in the resin composition is not particularly limited as long as the effect of the present invention is not impaired, and is 0.01 part by mass or more, preferably 0.05 part by mass or more, and more preferably 0.1 part by mass or more, based on 100 parts by mass of the polyamic acid. Meanwhile, the content of the cellulose compound in the resin composition is preferably 1.5 parts by mass or less, more preferably 1.3 parts by mass or less, and still more preferably 1.0 parts by mass or less, based on 100 parts by mass of the polyamic acid, from the viewpoint of the effect of the present invention.

[Nitrogen-Containing Aromatic Compound]

From the viewpoint of properly controlling the curing rate, the resin composition according to the present embodiment may contain a nitrogen-containing aromatic compound. This nitrogen-containing aromatic compound can be appropriately selected from among known compounds, and a compound including an imidazole skeleton in the molecule is preferably used.

Such compound including an imidazole skeleton in the molecule is preferably, for example, a compound represented by the following formula (B):

[Formula 25]

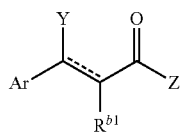

(B)

wherein, in the formula (B), Ar is an optionally substituted aromatic group, $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, Y is an imidazole ring represented by the following formula (B-y) or a hydrogen atom, Z is an imidazole ring represented by the following formula (B-y) or a group represented by —OR$^{b3}$, either Y or Z is the imidazole ring,

[Formula 26]

---------- is a single bond when Y is the imidazole ring, or a carbon-carbon double bond when Z is the imidazole ring, and R$^{b3}$ is a hydrogen atom or an organic group and,

[Formula 27]

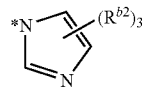

(B-y)

in the formula (B-y), * represents a bond to be bonded to the carbon atom adjacent to Y or Z in the formula (B), and R$^{b2}$(s) each independently represent a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group.

In the formula (B), Ar is an optionally substituted aromatic group. Ar may be an aromatic group having no substituent. The optionally substituted aromatic group may be either an optionally substituted aromatic hydrocarbon group or an optionally substituted aromatic heterocyclic group.

The type of the aromatic hydrocarbon group constituting Ar is not particularly limited without interfering with the object of the present invention. The aromatic hydrocarbon group may be a monocyclic aromatic group, may be formed by fusion of two or more aromatic hydrocarbon groups, or may be formed by bonding of two or more aromatic hydrocarbon groups through a single bond. The aromatic hydrocarbon group is preferably a phenyl group, a naphthyl group, a biphenylyl group, an anthryl group, or a phenanthrenyl group.

The type of the aromatic heterocyclic group constituting Ar is not particularly limited without interfering with the object of the present invention. The aromatic heterocyclic group may be either a monocyclic group or a polycyclic group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzoimidazolyl group.

Examples of the substituent, which may be possessed by an aromatic hydrocarbon group constituting Ar or an aromatic heterocyclic group, include a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, and an organic group. When the aromatic hydrocarbon group or the aromatic heterocyclic group have plural substituents, the plural substituents may be the same or different. When the aromatic hydrocarbon group constituting Ar or the aromatic heterocyclic group has a substituent, the number of substituents is usually 4 or less, preferably 3 or less, and may be 2 or less, and may be 1.

When the substituent, which is possessed by the aromatic hydrocarbon group constituting Ar or the aromatic heterocyclic group, is a halogen atom, the halogen atom can be selected from a fluorine atom, a chlorine atom, a bromine atom, and an iodine atom.

When the substituent, which is possessed by the aromatic hydrocarbon group constituting Ar or the aromatic heterocyclic group, examples of the organic group include an alkyl group, an alkenyl group, a cycloalkyl group, a cycloalkenyl group, an aryl group, and an aralkyl group. This organic group may have a bond or a substituent, other than a hydrocarbon group such as a heteroatom, in the organic group. This organic group may be either linear, branched, or cyclic. This organic group is usually monovalent, but can be a divalent or higher polyvalent organic group when forming a cyclic structure.

When the aromatic group constituting Ar has a substituent on neighboring carbon atoms, two substituents bonded on neighboring carbon atoms may be bonded to form a cyclic structure. Examples of the cyclic structure include an aliphatic hydrocarbon ring, and an aliphatic ring having a heteroatom.

When the substituent, which is possessed by the aromatic hydrocarbon group constituting Ar or the aromatic heterocyclic group, is an organic group, the bond included in the organic group is not particularly limited, without impairing the effect of the present invention, and the organic group may include a bond having a heteroatom such as an oxygen atom, a nitrogen atom, a sulfur atom, or a silicon atom. From the viewpoint of the heat resistance of the compound represented by the formula (B), specific examples of the bond containing a heteroatom include, an ether bond, a thioether bond, a carbonyl bond, a thiocarbonyl bond, an ester bond, an amide bond, an amino bond (—NR—: R represents a hydrogen atom or a monovalent organic group), a urethane bond, an imino bond (—N=C(—R)—, —C(=NR)—: R represents a hydrogen atom or a monovalent organic group), a carbonate bond, a sulfonyl bond, a sulfinyl bond, an azo bond, and the like.

When the substituent possessed by Ar is a substituent other than the hydrocarbon group, the type of the substituent other than the hydrocarbon group is not particularly limited without interfering with the object of the present invention. Specific examples of the substituent other than the hydrocarbon group include a halogen atom, a hydroxyl group, a mercapto group, a sulfide group, a cyano group, an isocyano group, a cyanato group, an isocyanato group, a thiocyanato group, an isothiocyanato group, an silyl group, an silanol group, an alkoxy group, an alkoxycarbonyl group, an amino group, a monoalkylamino group, a dialkylamino group, a monoarylamino group, a diarylamino group, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phosphonato group, an alkyl ether group, an alkenyl ether group, an alkyl thioether group, an alkenyl thioether group, an aryl ether group, an aryl thioether group, and the like. The hydrogen atom included in the substituent mentioned above may be substituted with a hydrocarbon group. The hydrocarbon group included in the substituent mentioned above may be either linear, branched, or cyclic.

The substituent, which is possessed by the aromatic hydrocarbon group constituting Ar or the aromatic heterocyclic group, is preferably an alkyl group having 1 to 12 carbon atoms, an aryl group having 1 to 12 carbon atoms, an alkoxy group having 1 to 12 carbon atoms, an aryloxy group having 1 to 12 carbon atoms, an arylamino group having 1 to 12 carbon atoms, and a halogen atom.

Ar is preferably an optionally substituted phenyl group, an optionally substituted furyl group, or an optionally substituted thienyl group, since a compound represented by the formula (B) can be synthesized inexpensively and easily, and the compound has satisfactory solubility in an organic solvent.

In the formula (B), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group.

When $R^{b1}$ is a halogen atom, the halogen atom can be selected from a fluorine atom, a chlorine atom, a bromine atom, and an iodine atom.

When $R^{b1}$ is an organic group, the organic group is preferably an alkyl group, an aromatic hydrocarbon group, and an aromatic heterocyclic group. The alkyl group is preferably a linear or branched alkyl group having 1 to 8 carbon atoms, and more preferably a methyl group, an ethyl group, an n-propyl group, and an isopropyl group. The aromatic hydrocarbon group is preferably a phenyl group, a naphthyl group, a biphenylyl group, an anthryl group, and a phenanthrenyl group, more preferably a phenyl group and a naphthyl group, and particularly preferably a phenyl group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzoimidazolyl group, and more preferably a furyl group and a thienyl group.

In the formula (B), Y is the above-mentioned imidazole ring represented by the formula (B-y) or a hydrogen atom. The formula (B-y) will be mentioned later.

In the formula (B), Z is an imidazole ring represented by the formula (B-y), or a group represented by —$OR^{b3}$. This $R^{b3}$ is a hydrogen atom or an organic group. When $R^{b3}$ is an organic group, the organic group is preferably an alkyl group. The alkyl group may be either a linear alkyl group or a branched alkyl group. The number of carbon atoms of the alkyl group is not particularly limited, but is preferably 1 to 20, more preferably 1 to 10, and further preferably 1 to 5.

Specific examples of the alkyl group suitable as $R^{b3}$ include a methyl group, an ethyl group, an n-propyl group, an isopropyl group, an n-butyl group, an isobutyl group, a sec-butyl group, a tert-butyl group, an n-pentyl group, an isopentyl group, a tert-pentyl group, an n-hexyl group, an n-heptyl group, an n-octyl group, a 2-ethyl-n-hexyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

In the formula (B), either Y or Z is an imidazole ring represented by the formula (B-y). An imidazole group-containing compound (B) is typically a compound represented by the below-mentioned formula (B2) when Y is the imidazole ring, and is typically a compound represented by the below-mentioned formula (B1) when Z is the imidazole ring.

In the formula (B),
[Formula 28]

is a single bond when Y is an imidazole ring represented by the formula (B-y), and is a carbon-carbon double bond when Z is the imidazole ring.

In the formula (B-y), * represents a bond to be bonded to the carbon atom adjacent to Y or Z in the formula (B).

In the formula (B-y), $R^{b2}$ is a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, any one of these atoms or groups is bonded to an imidazole ring.

When $R^{b2}$ is a halogen atom, the halogen atom can be selected from a fluorine atom, a chlorine atom, a bromine atom, and an iodine atom.

When the $R^{b2}$ is an organic group, examples of the organic group include an alkyl group, an alkenyl group, a cycloalkyl group, a cycloalkenyl group, an aromatic hydrocarbon group, an aromatic heterocyclic group, and an aralkyl group. This organic group may contain, in the organic group, bonds or substituents other than a hydrocarbon group, such as a heteroatom. This organic group may be linear, branched, or cyclic. This organic group is usually monovalent, but can be a divalent or higher polyvalent organic group when forming a cyclic structure to be fused with an imidazole ring. As used herein, "heteroatom" means an oxygen atom, a nitrogen atom, and a sulfur atom unless otherwise specified.

When $R^{b2}$ is an organic group, the organic group is preferably an alkyl group, an aromatic hydrocarbon group, and an aromatic heterocyclic group. The alkyl group is preferably a linear or branched alkyl group having 1 to 8 carbon atoms, and more preferably a methyl group, an ethyl group, an n-propyl group, and an isopropyl group. The aromatic hydrocarbon group is preferably a phenyl group, a naphthyl group, a biphenylyl group, an anthryl group, and a phenanthrenyl group, more preferably a phenyl group and a naphthyl group, and particularly preferably a phenyl group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzoimidazolyl group, and more preferably a furyl group and a thienyl group.

When $R^{b2}$ is an alkyl group, the position of the organic group bonding on an imidazole ring is preferably any one of 2-, 4-, and 5-positions, and more preferably 2-position.

As the compound represented by the formula (B), specifically, an imidazole group-containing compound represented by the formula (B1) or the formula (B2) is preferably used.

(Compound Represented by the Formula (B1))

A compound including an imidazole skeleton in the molecule, which can be included in the resin composition of the present embodiment, is represented, as an aspect, by the following formula (B1):

[Formula 29]

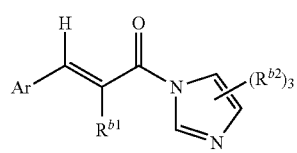

(B1)

wherein, in the formula (B1), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}$(s) each independently represent a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, and Ar is an optionally substituted aromatic group.

In the formula (B1), $R^{b1}$, $R^{b2}$, and Ar are respectively the same as those defined in the formula (B), so that the description is omitted here.

Among the compounds represented by the formula (B1) which can be included in the resin composition, a compound represented by the following formula (B1-1) is preferable in the present embodiment from the viewpoint of the solubility in the organic solvent and the compatibility with the polyamic acid:

[Formula 30]

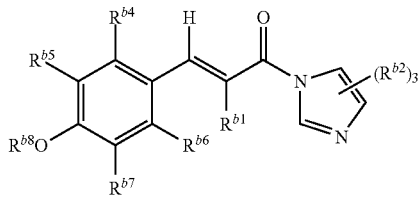

wherein, in the formula (B1-1), $R^{b1}$ and $R^{b2}$ are the same as those defined in the formula (B1), $R^{b4}$ to $R^{b7}$ are each independently a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, and $R^{b8}$ is a hydrogen atom or an organic group.

In the formula (B1-1), $R^{b1}$ and $R^{b2}$ are the same as those defined in the formula (B1), and are therefore the same as those defined in the formula (B).

In the formula (B1-1), $R^{b4}$ to $R^{b7}$ are each independently a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group. When $R^{b4}$ to $R^{b7}$ are halogen atoms, it is possible to employ, as the halogen atom, a halogen atom which is the same as a halogen atom with which the above-mentioned Ar in the formula (B) may be substituted. When $R^{b4}$ to $R^{b7}$ are organic groups, it is possible to employ, as the organic group, an organic group which is the same as an organic group with which the above-mentioned Ar in the formula (B) may be substituted.

In the formula (B1-1), $R^{b8}$ is a hydrogen atom or an organic group. Among these, $R^{b8}$ is preferably an organic group, thus enabling further improvement of the compatibility with the polyamic acid or the solubility in the organic solvent. Examples of the organic group constituting $R^{b8}$ include an alkyl group, an alkenyl group, a cycloalkyl group, a cycloalkenyl group, an aryl group, and an aralkyl group. Among these, an alkyl group is preferable. The alkyl group may be either a linear alkyl group or a branched alkyl group. The number of carbon atoms of the alkyl group is not particularly limited, but is preferably 1 to 20, more preferably 1 to 10, and further preferably 1 to 5.

Specific examples of the alkyl group suitable as $R^{b8}$ in the formula (B1-1) include a methyl group, an ethyl group, an n-propyl group, an isopropyl group, an n-butyl group, an isobutyl group, a sec-butyl group, a tert-butyl group, an n-pentyl group, an isopentyl group, a tert-pentyl group, an n-hexyl group, an n-heptyl group, an n-octyl group, a 2-ethyl-n-hexyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group. Among these, a methyl group, an ethyl group, an n-propyl group, an isopropyl group, an n-butyl group, an isobutyl group, a sec-butyl group, a tert-butyl group, an n-pentyl group, an isopentyl group, and a tert-pentyl group are preferable.

Preferred specific examples of the compound represented by the formula (B1) include the following.

[Formula 31]

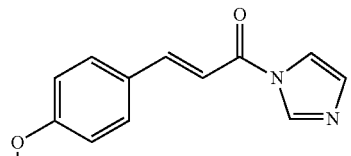

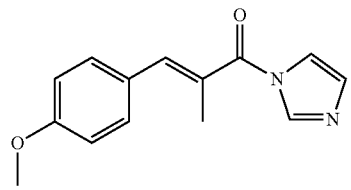

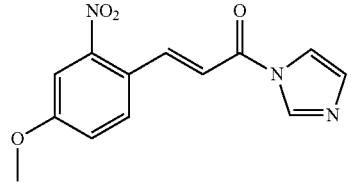

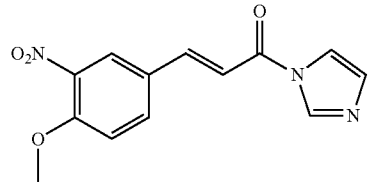

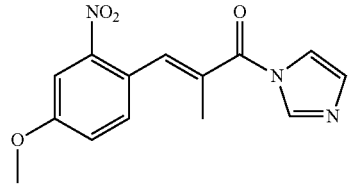

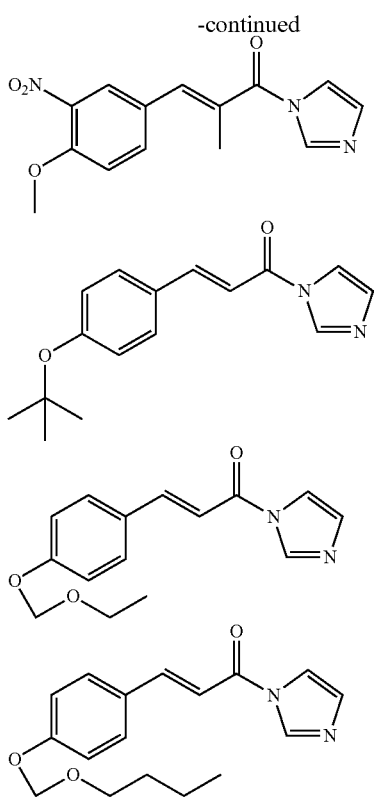

(Compound Represented by the Formula (B2))

A compound including an imidazole skeleton in the molecule, which can be included in the composition of the present embodiment, is represented, as an aspect, by the following formula (B2):

[Formula 32]

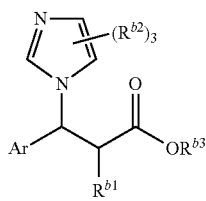

(B2)

wherein, in the formula (B2), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}(s)$ are each independently a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, $R^{b3}$ is a hydrogen atom or an organic group, and Ar is an optionally substituted aromatic group.

In the formula (B2), $R^{b1}$, $R^{b2}$, $R^{b3}$, and Ar are respectively the same as those defined in the formula (B), so that the description is omitted here.

Among the imidazole group-containing compound represented by the formula (B2) which can be included in the composition of the present embodiment, a compound represented by the following formula (B2-1) is preferable from the viewpoint of the solubility in the organic solvent and the compatibility with the polyamic acid:

[Formula 33]

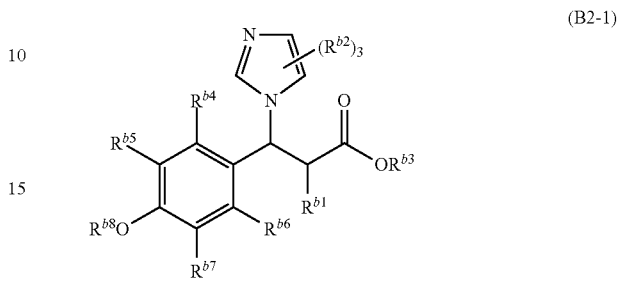

(B2-1)

wherein, in the formula (B2-1), $R^{b1}$, $R^{b2}$, and $R^{b3}$ are the same as those defined in the formula (B2), $R^{b4}$ to $R^{b7}$ are each independently a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group, and $R^{b8}$ is a hydrogen atom or an organic group.

In the formula (B2-1), $R^{b1}$, $R^{b2}$, and $R^{b3}$ are the same as those defined in the formula (B2), and are therefore the same as those defined in the formula (B).

In the formula (B2-1), it is possible to employ, as $R^{b4}$ to $R^{b8}$, those which are the same as defined in the formula (B1-1).

In the formula (B2-1), $R^{b8}$ is a hydrogen atom or an organic group. Among these, $R^{b8}$ is preferably an organic group, thus enabling further improvement of the compatibility with the polyamic acid or the solubility in the organic solvent. Examples of the organic group constituting $R^{b8}$ include an alkyl group, an alkenyl group, a cycloalkyl group, a cycloalkenyl group, an aryl group, and an aralkyl group. Among these, an alkyl group is preferable. The alkyl group may be either a linear alkyl group or a branched alkyl group. The number of carbon atoms of the alkyl group is not particularly limited, but is preferably 1 to 20, more preferably 1 to 10, and further preferably 1 to 5.

Specific examples of the alkyl group suitable as $R^{b8}$ include a methyl group, an ethyl group, an n-propyl group, an isopropyl group, an n-butyl group, an isobutyl group, a sec-butyl group, a tert-butyl group, an n-pentyl group, an isopentyl group, a tert-pentyl group, an n-hexyl group, an n-heptyl group, an n-octyl group, a 2-ethyl-n-hexyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group. Among these, preferred are a methyl group, an ethyl group, an n-propyl group, an isopropyl group, an n-butyl group, an isobutyl group, a sec-butyl group, a tert-butyl group, an n-pentyl group, an isopentyl group, and a tert-pentyl group.

Preferred specific examples of the compound represented by the formula (B2) include the following.

[Formula 34]
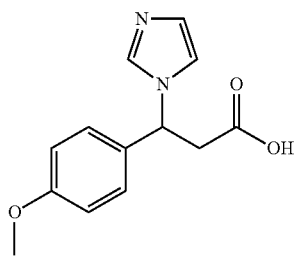
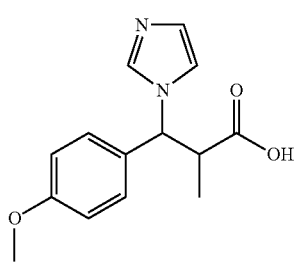
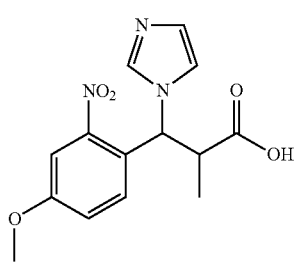
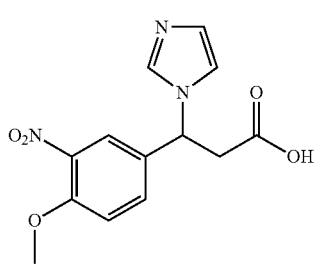
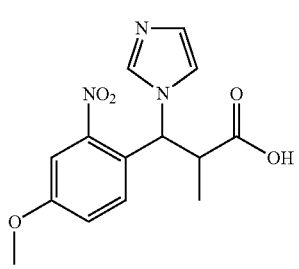
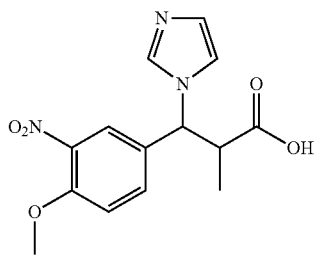
-continued
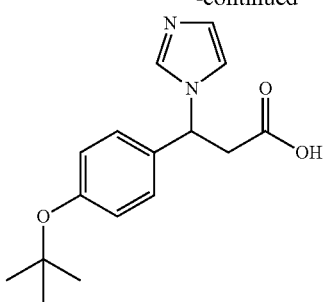
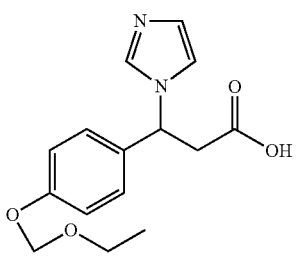
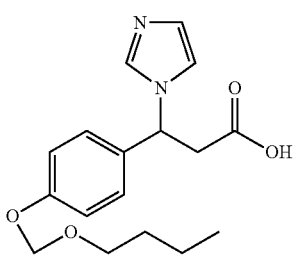
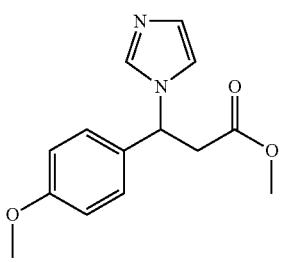
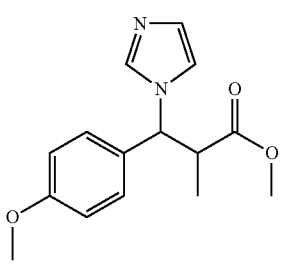
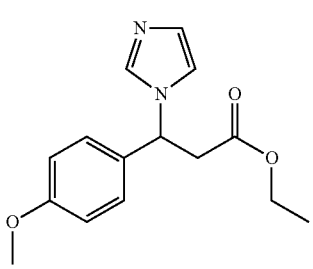

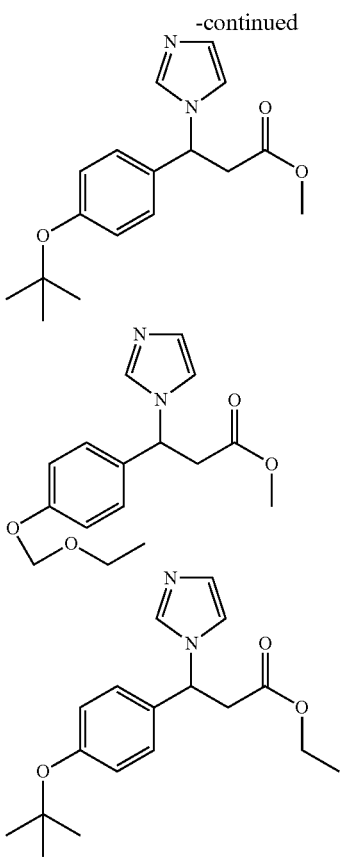

The lower limit of the content of the nitrogen-containing aromatic compound in the resin composition of the present embodiment is not particularly limited and is, for example, 3% by mass or more, preferably 5% by mass or more, and still more preferably 10% by mass or more, or 12% by mass or more, based on 100 parts by mass of the polyamic acid. Meanwhile, the upper limit of the content of the nitrogen-containing aromatic compound in the resin composition of the present embodiment is not particularly limited and is, for example, 50% by mass or less, preferably 45% by mass or less, still more preferably 40% by mass or less, and yet preferably 35% by mass or less, based on 100 parts by mass of the polyamic acid.

[Organic Solvent]

The organic solvent contained in the resin composition according to the first aspect may be a paste containing a solid or a solution. In view of easily forming a uniform and smooth cured article, the resin composition is preferably a solution. Solvents can be used alone, or two or more solvents can be used in combination.

There is no particular limitation on the type of the organic solvent as long as it does not interfere with the object of the present invention. Examples of suitable organic solvent include nitrogen-containing polar solvents such as N-methyl-2-pyrrolidone (NMP), N,N-dimethylacetamide (DMAc), N,N-dimethylisobutylamide, N,N-diethylacetamide, N,N-dimethylformamide (DMF), N,N-diethylformamide, N-methylcaprolactam, 1,3-dimethyl-2-imidazolidinone (DMI), pyridine, and N,N,N',N'-tetramethylurea (TMU); lactone-based polar solvents such as β-propiolactone, γ-butyrolactone, γ-valerolactone, δ-valerolactone, γ-caprolactone, and ε-caprolactone; dimethyl sulfoxide; hexamethylphosphoric tripamides; acetonitrile; fatty acid esters such as ethyl lactate and butyl lactate; ethers such as diethylene glycol dimethyl ether, diethylene glycol diethyl ether, dioxane, tetrahydrofuran, methyl cellosolve acetate, and ethyl cellosolve acetate, glyme; and aromatic solvents such as benzene, toluene, and xylene.

The organic solvent preferably contains a compound represented by the following formula (S1):

[Formula 35]

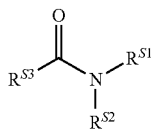

(S1)

wherein, in the formula (S1), $R^{S1}$ and $R^{S2}$ are each independently an alkyl group having 1 to 3 carbon atoms, and $R^{S3}$ is a group represented by the following formula (S1-1) or the following formula (S1-2):

[Formula 36]

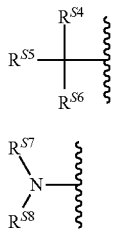

(S1-1)

(S1-2)

wherein, in the formula (S1-1), $R^{S4}$ is a hydrogen atom or a hydroxyl group, and $R^{S5}$ and $R^{S6}$ are each independently an alkyl group having 1 to 3 carbon atoms and, in the formula (S1-2), $R^{S7}$ and $R^{S8}$ are each independently a hydrogen atom or an alkyl group having 1 to 3 carbon atoms.

Specific examples of a compound in which $R^{S3}$ is a group represented by the formula (S1-1) among the compounds represented by the formula (S1) include N,N,2-trimethylpropionamide, N-ethyl,N,2-dimethylpropionamide, N,N-diethyl-2-methylpropionamide, N,N,2-trimethyl-2-hydroxypropionamide, N-ethyl-N,2-dimethyl-2-hydroxypropionamide, and N,N-diethyl-2-hydroxy-2-methylpropionamide.

Specific examples of a compound in which $R^{S3}$ is a group represented by the formula (S1-2) among the compounds represented by the formula (S1) include N,N,N',N'-tetramethylurea, N,N,N',N'-tetraethylurea, and the like.

Among compounds represented by the formula (S1), particularly preferable compound is preferably N,N,2-trimethylpropionamide and N,N,N',N'-tetramethylurea. A boiling point of N,N,2-trimethylpropionamide under atmospheric pressure is 175° C., and a boiling point of N,N,N',N'-tetramethylurea under atmospheric pressure is 177° C. In this way, N,N,2-trimethylpropionamide and N,N,N',N'-tetramethylurea have comparatively low boiling point among solvents capable of dissolving a monomer component and a polyamic acid. Therefore, when using a resin composition containing an organic solvent which contains at least one selected from N,N,2-trimethylpropionamide and N,N,N',N'-tetramethylurea, the organic solvent is less likely to remain in the thus formed cured article film during heating upon curing, so that the tensile elongation of the thus obtained cured article is less likely to decrease.

Furthermore, N,N,2-trimethylpropionamide and N,N,N',N'-tetramethylurea are also useful since they are not designated as a substance of very high concern (SVHC), which is a substance of hazard concern in REACH regulation of the European Union (EU), and are less hazardous substances.

The content of the compound represented by the formula (S1) in the organic solvent is not particularly limited without interfering with the object of the present invention. Typically, a ratio of the compound represented by the formula (S1) to the mass of the organic solvent is preferably 20% by mass or more, more preferably 30% by mass or more, and particularly preferably 40% by mass or more.

The content of the organic solvent in the resin composition is not particularly limited without interfering with the object of the present invention. The content of the organic solvent is appropriately adjusted according to the solid content in the resin composition. The solid content in the resin composition is, for example, 1 to 80% by mass, preferably 5 to 70% by mass, and more preferably 10 to 60% by mass.

(Another Component)

The resin composition may include, in addition to the above-mentioned components, another component as long as it does not interfere with the object of the present invention. Examples of another component include base generator components, polymerizable components such as a monomer, surfactants, plasticizers, viscosity modifiers, defoamers, and colorants.

<Properties of Resin Composition>

The resin composition of the present embodiment preferably has the following properties.

(Surface Smoothness)

Regarding a 13 µm-thick cured article obtained by curing the resin composition under the following conditions, an arithmetic average roughness (Ra) to be measured in accordance with JIS B 0601 is preferably 150 Å or less, more preferably 140 Å or less, still more preferably 130 Å or less, and particularly preferably 120 Å or less.

(Conditions)

First, the resin composition is coated on a base and the pressure is reduced to 13 Pa from a normal pressure (1 atm). After the pressure is once returned to a normal pressure, the coated base is heated under an air atmosphere at 80° C. for 10 minutes and then heated under the conditions of an oxygen concentration of 100 ppm (preferably under an atmosphere of an inert gas such as $N_2$ or Ar) at 360° C. for 30 minutes to obtain a cured article having a thickness of 13 µm.

(Transmittance)

Regarding the 13 µm-thick cured article obtained by curing the resin composition under the following conditions, a transmittance at a wavelength of 450 nm or 550 nm to be measured is preferably 60% or more, more preferably 70% or more, and still more preferably 80% or more.

(Conditions)

First, the resin composition is coated on a base and the pressure is reduced to 13 Pa from a normal pressure (1 atm). After the pressure is once returned to a normal pressure, the coated base is heated under an air atmosphere at 80° C. for 10 minutes and then heated under the conditions of an oxygen concentration of 100 ppm (preferably under an atmosphere of an inert gas such as $N_2$ or Ar) at 360° C. for 30 minutes to obtain a cured article having a thickness of 13 µm.

<Method for Producing Cured Article>

The method for producing a cured article according to the second aspect of the present invention includes a coating film formation step of coating the resin composition according to the first aspect on a base to form a coating film, and a heating step of heating the coating film at 70 to 550° C.

The material of the base to be used is not particularly limited as long as thermal deterioration or deformation does not occur when the resin composition coated on the base is heated. The shape of the base is not also particularly limited as long as the resin composition can be coated. Examples of the base include electronic elements such as semiconductor elements and intermediate products such as multilayer wiring boards, and various substrates, on which electrodes or wirings to be insulated are formed. When the base is a substrate, examples of suitable material of the substrate include glass; silicon; aluminum (Al); aluminum alloys such as aluminum-silicon (Al—Si), aluminum-copper (Al—Cu), and aluminum-silicon-copper (Al—Si—Cu); titanium (Ti); titanium alloys such as titanium-tungsten (Ti—W); titanium nitride (TiN); tantalum (Ta); tantalum nitride (TaN); tungsten (W); tungsten nitride (WN); and copper.

By forming a cured article on a base using electronic elements such as semiconductor elements or multilayer wiring boards as the base, an insulating film can be formed on electronic elements or multilayer wiring boards. Using a plate-shaped substrate as the base, a cured article is formed, thus enabling formation of a cured film. The cured film to be formed on a substrate may be used as it is on the substrate, or used in a state of being peeled from the substrate.

In the coating film formation step, the above-mentioned resin composition is coated on a surface of the base to form a coating film. Examples of the coating method include a dip coating method, a spraying method, a bar coating method, a roll coating method, a spin coating method, a curtain coating method, a die coating method, and the like. There is no particular limitation on the thickness of the coating film. Typically, the thickness of the coating film is, for example, 0.1 to 1,000 µm, preferably 2 to 100 µm, and more preferably 3 to 50 µm. The thickness of the coating film can be appropriately controlled by adjusting the coating method, and the solid component concentration and the viscosity of the resin composition.

In the heating step, the coating film is heated at 70 to 550° C. By the heating, the polyamic acid can be ring-closed to be converted into a polyimide resin.

The heating temperature is preferably set at 100 to 500° C., more preferably 120 to 400° C., and still more preferably 150 to 350° C. By heating a resin composition at a temperature in such range, a cured article can be formed while inhibiting thermal deterioration or thermal decomposition of a resin composition component or a polyimide resin to be formed.

When the resin composition is heated at a high temperature, high energy consumption and deterioration with time of treatment facilities at a high temperature are sometimes promoted, so that it is also preferred to heat the resin composition at a lower temperature (sometimes referred to as "low temperature baking"). Specifically, it is possible to set the upper limit of the temperature, at which the resin composition is heated, for example, at 220° C. or lower, preferably 200° C. or lower, more preferably 180° C. or lower, still more preferably 160° C. or lower, and yet more preferably 150° C. or lower. Even when heating at such comparatively low temperature, a polyimide resin can be sufficiently produced by heating within comparatively short time in the present invention. Low temperature baking enables proceeding of increasing the molecular weight of the polyamic acid, and preferably enables proceeding of increasing the molecular weight without widening the molecular weight distribution too much.

Although the heating time varies depending on the composition and the thickness of the coating film, the lower limit of the heating time can be set, for example, at 0.5 hour, preferably 1 hour, and more preferably 1.5 hours, and the upper limit can be set, for example, at 8 hours, preferably 7 hours, and more preferably 6 hours. Such heating time can be defined as the total value of a processing time at a high temperature and a processing time of low temperature baking. Such heating time can also be applied when heating, for example, at 130 to 150° C., and typically 140° C.

From the viewpoint of moisture removal and production efficiency, it is preferred to further include a pressure-reducing (drying) step of subjecting the coating film to pressure reduction to 10 to 100 Pa before the heating step. This pressure-reducing (drying) step typically starts from an atmospheric pressure.

<Cured Article>

The cured article according to the third aspect of the present invention is obtained by curing the resin composition according to the first aspect. Regarding the cured article, an arithmetic average roughness (Ra) to be measured in accordance with JIS B 0601 is preferably 150 Å or less, more preferably 140 Å or less, still more preferably 130 Å or less, and particularly preferably 120 Å or less.

Regarding the cured article, a transmittance at a wavelength of 450 nm or 550 nm is preferably 60% or more, more preferably 70% or more, and still more preferably 80% or more. When the cured article is a film, the thickness is, for example, 0.1 to 1,000 μm, preferably 2 to 100 μm, and more preferably 3 to 50 μm.

The coefficient of thermal expansion of the cured article is preferably 20 ppm/K or less. If such coefficient of thermal expansion is in the above range, peeling tends to hardly occur due to thermal history even when a composite material is fabricated by using metal having a coefficient of thermal expansion in a range of 5 to 20 ppm/K in combination of an inorganic substance. From the viewpoint of sufficiently suppressing peeling from occurring due to thermal history and of being capable of more improving the dimensional stability, the coefficient of thermal expansion is more preferably −20 to 20 ppm/K, and still more preferably 0 to 15 ppm/K. When such coefficient of thermal expansion is more than the lower limit, peeling and curling tends to hardly occur.

An elongation at break of the cured article is preferably 3 to 40%, more preferably 5 to 35%, and still more preferably 8 to 32%. An elastic modulus of the cured article is preferably 1 to 5 GPa, more preferably 1.2 to 4%, and still more preferably 1.5 to 3%.

The cured article is particularly excellent in the transmittance and surface smoothness, and exhibits small coefficient of thermal expansion and satisfactory elongation at break and elastic modulus. Therefore, the cured article is suitable for applications that require these properties. Examples of specific applications of the cured article include electronic circuit board members, semiconductor devices, lithium ion battery members, solar battery members, fuel battery members, gas separation membrane members, motor windings, engine peripheral members, coating materials, optical components, heat dissipating bases, and magnetic wave shielding bases, adhesives and sealants in surge components, insulating materials, substrate materials, or protective materials. It is also possible to use as a substitute of glass used in display materials, and the cured article is also suitable for use in flexible films for displays, and low moisture permeable films, in addition to automotive reflectors.

<Flexible Substrate, Flexible Display>

The flexible substrate according to the fourth aspect of the present invention includes a cured article according to the third aspect. The cured article according to the third aspect is likely to be excellent in flexibility and insulation properties, and can be suitably used as an insulating layer in the flexible substrate. Specific examples of the flexible substrate include those equipped with the cured article and a metal foil such as a copper foil provided on this cured article. The flexible display according to the fifth aspect of the present invention includes the cured article according to the third aspect. The cured article according to the third aspect is not only excellent in flexibility and insulation properties, but also particularly excellent in transmittance and surface smoothness, as mentioned above. Therefore, the cured article can be suitably applied to the flexible display.

Examples

The present invention will be more specifically described by way of Examples, but the scope of the present invention is not limited to these Examples.

[Preparation of Polyamic Acid]

In a separable flask equipped with a stirrer, a stirring blade, a reflux condenser, and a nitrogen gas introducing tube, tetracarboxylic dianhydride having a structure shown below and N-methyl-2-pyrrolidone were charged, and then nitrogen was introduced into the flask through a nitrogen gas introducing tube to replace the atmosphere inside the flask with a nitrogen gas atmosphere. Then, the flask was immersed in an ice bath and an N-methyl-2-pyrrolidone solution of p-phenylenediamine was gradually added dropwise to tetracarboxylic dianhydride in the amount of 1.0 mol while stirring contents. After completion of the dropwise addition, a reaction was performed at 50° C. for 20 hours to obtain a solution containing a polyamic acid. The tetracarboxylic dianhydride having a structure shown below was prepared in accordance with the method mentioned in Synthesis Example 1, Example 1 and Example 2 disclosed in WO 2011/099518 A, and the solution was prepared such that the solid component concentration of the thus obtained polyamic acid would be 15% by mass.

[Formula 37]

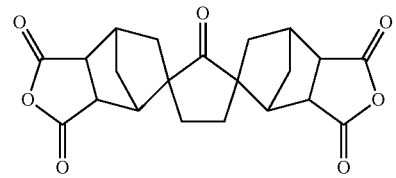

<Preparation of Resin Composition>

To the thus obtained solution of the polyamic acid, a compound having an imidazole skeleton represented by the following formula in the molecule (compound 1) was added in the amount of 30 parts by mass based on 100 parts by mass of the polymeric acid under a nitrogen atmosphere.

[Formula 38]

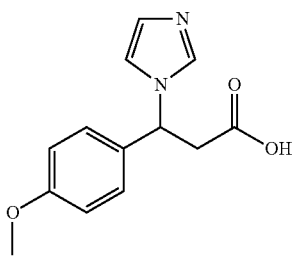

Compound 1

Subsequently, hydroxypropyl cellulose (CELNY (registered trademark) SSL; manufactured by NISSO HPC) was added in the amount of 0.1 part by mass based on 100 parts by mass of the polyamic acid. Then, the reaction solution was stirred at 25° C. for 12 hours to obtain a resin composition containing a hydroxypropyl cellulose and a polyamic acid of Example 1.

In the same manner as in Example 1, except that the type of the hydroxypropyl cellulose (CELNY (registered trademark) SSL or CELNY (registered trademark) SL (both are manufactured by NISSO HPC)) and the use amount were changed as shown in Table 1 below, resin compositions of Examples 2 and 3, and Comparative Examples 1 and 2 were prepared. CELNY (registered trademark) SSL has a weight average molecular weight of about 40,000 and CELNY (registered trademark) SL has a weight average molecular weight of about 100,000.

<Tests>

Using each of the resin compositions of Examples and Comparative Examples, a cured film was formed and then evaluated by performing the following tests.

(Surface Roughness and Transmittance)

First, the resin composition is coated on a base and the pressure is reduced to 13 Pa from a normal pressure. After the pressure is once returned to a normal pressure, the coated base is heated under an air atmosphere at 80° C. for 10 minutes and then heated under the conditions of an oxygen concentration of 100 ppm at 360° C. for 30 minutes to obtain a cured film having a thickness of 13 μm. Regarding the thus obtained cured film, using a surface roughness measuring instrument (trade name "E-35B", manufactured by Tokyo Seimitsu Co., Ltd.), an arithmetic average roughness (Ra) was measured in accordance with JIS B 0601.

(Transmittance)

Regarding the thus obtained cured film, using a measuring device manufactured by Nippon Denshoku Industries Co., Ltd. under the trade name of "Haze Meter NDH-5,000", a transmittance (%) at a wavelength of 450 nm and 550 nm was measured in accordance with JIS K7361-1 (issued in 1997).

(Coefficient of Thermal Expansion (CTE))

First, using each of the resin compositions of Examples and Comparative Examples, a cured film having a size of 76 mm in length, 52 mm in width, and 13 μm in thickness was obtained. Using the thus obtained cured film as a sample and employing a thermomechanical analyzer (manufactured by Rigaku Corporation under the trade name of "TMA8310") as a measuring device, a change of the length in a longitudinal direction of the sample at 50° C. to 200° C. was measured under a nitrogen atmosphere at a tensile mode (49 mN) and a temperature rise rate of 5° C./minute to measure an average of the change of the length per 1° C. (1K) in a temperature range of 50° C. to 200° C. The average thus measured was employed as the value of a coefficient of thermal expansion of the cured film.

(Elongation at Break)

First, "Super Dumbbell Cutter (trade name) (Model: SDMK-1000-D, in accordance with A22 standard of JIS K7139 (issued in 2009))" manufactured by DUMBBELL CO., LTD. was attached to an SD type lever-controlled sample cutter (cutter (Model: SDL-200), manufactured by DUMBBELL CO., LTD.), and then a cured film was cut so as to have a size of 75 mm in total length, 57 mm in distance between the tab portions, 30 mm in length of the parallel portion, 30 mm in radius of the shoulder portion, 10 mm in width of the end portion, 5 mm in width of the central parallel portion, and 13 μm in thickness to fabricate a Dumbbell-shaped specimen (specimen fabricated in accordance with the standard of JIS K7139 type A22 (scale specimen), except that the thickness was set at 13 μm) as a measurement sample. After disposing the measurement sample so as to set a width between holding tools at 57 mm and a width of the holding portion at 10 mm (total width of the end portion), a tensile test of pulling a measurement sample under the conditions of a full-scale load of 0.05 kN and a test speed of 5 mm/minute was performed using a Tensilon universal-testing machine (manufactured by A&D Company, Limited, Model "UCT-10T") to determine the value of elongation at break. The above test is a test in accordance with JIS K7162 (issued in 1994). The value of the elongation at break (%) was determined by calculation of the following equation:

[Elongation at break (%)]=$\{(L-L_0)/L_0\} \times 100$ where $L_0$ is a length of the parallel portion of the specimen (=length of the parallel portion: 30 mm) and L is a length of the parallel portion of the specimen until it breaks (length of the parallel portion of the specimen when it breaks: 30 mm+α).

(Elastic Modulus)

Using "DCM-SA2" (product name, manufactured by MTS Systems Corporation), an elastic modulus of a cured film (having a thickness of 13 μm) was measured.

The test results of the above each item are shown in Table 1 below.

TABLE 1

|  | Cellulose compound (Parts by mass*) | Surface roughness (Å) | Transmittance (450 nm) (%) | Transmittance (550 nm) (%) | CTE (ppm/K) | Elongation at break (%) | Elastic modulus (GPa) |
|---|---|---|---|---|---|---|---|
| Example 1 | SSL** (0.1) | 139 | 87.5 | 89.7 | 7.80 | 25.4 | 2.12 |
| Example 2 | SSL (1) | 127 | 74.0 | 84.6 | 7.92 | 23.87 | 1.94 |
| Example 3 | SSL (2) | 118 | 46.4 | 64.7 | 8.12 | 24.77 | 1.24 |
| Comparative Example 1 | None | 823 | 87.0 | 89.7 | 7.74 | 24.77 | 1.69 |

| | Cellulose compound (Parts by mass*) | Surface roughness (Å) | Transmittance (450 nm) (%) | Transmittance (550 nm) (%) | CTE (ppm/K) | Elongation at break (%) | Elastic modulus (GPa) |
|---|---|---|---|---|---|---|---|
| Comparative Example 2 | SL*** (0.1) | 674 | 42.2 | 55.3 | 7.40 | 21.54 | 1.75 |

*Parts by mass based on 100 parts by mass of polyamic acid,
**CELNY (registered trademark) SSL,
***CELNY (registered trademark) SL As is apparent from the results shown in Table 1 above, the sample containing no cellulose compound of Comparative Example 1 and the sample in which the weight average molecular weight of the cellulose compound deviates from the scope of the present invention of Comparative Example 2 exhibit large surface roughness and are inferior in surface smoothness, thus failing to satisfy both the transmittance and surface smoothness. Meanwhile, it is apparent that all samples of Examples 1 to 3 satisfy both the transmittance and surface smoothness. It is apparent that the samples in which the content of the cellulose compound is 1.5 parts by mass or less based on 100 parts by mass of the polyamic acid of Examples 1 and 2 are particularly excellent in transmittance.

What is claimed is:

1. A resin composition comprising:
    a polyamic acid having a structural unit represented by the following formula (1):

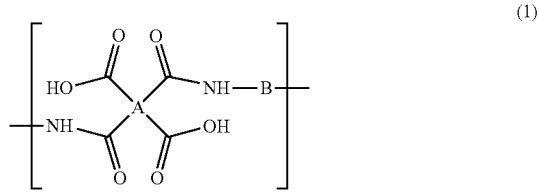

(1)

wherein A is a tetravalent organic group comprising an alicyclic group selected from the group consisting of tricyclo cyclic, tetracyclo cyclic, and spirocyclic groups, and B is a divalent organic group;
   a cellulose compound having a weight average molecular weight of 60,000 or less; and
   an organic solvent.

2. The resin composition according to claim 1, wherein the cellulose compound is a hydroxyalkyl cellulose.

3. The resin composition according to claim 1, wherein the content of the cellulose compound is 1.5 parts by mass or less based on 100 parts by mass of the polyamic acid.

4. The resin composition according to claim 1, wherein, when a cured article having a film thickness of 13 μm is obtained by curing the resin composition under the following conditions, an arithmetic average roughness (Ra) measured in accordance with JIS B 0601 is 150 Å or less:
   the resin composition is first coated on a base and the pressure is reduced to 13 Pa, then after the pressure is returned to a normal pressure, the coated base is heated under an air atmosphere at 80° C. for 10 minutes and then heated under the conditions of an oxygen concentration of 100 ppm at 360° C. for 30 minutes to obtain the cured article having a film thickness of 13 μm.

5. The resin composition according to claim 1, wherein when a cured article having a film thickness of 13 μm is obtained by curing the resin composition under the following conditions, a transmittance at a wavelength of 450 nm to be measured is 70% or more:
   the resin composition is first coated on a base and the pressure is reduced to 13 Pa, then after the pressure is returned to a normal pressure, the coated base is heated under an air atmosphere at 80° C. for 10 minutes and then heated under the conditions of an oxygen concentration of 100 ppm at 360° C. for 30 minutes to obtain the cured article having a film thickness of 13 μm.

6. A method for producing a cured article, the method comprising:
   coating the resin composition according to claim 1 on a base to form a coating film; and
   heating the coating film at 70 to 550° C.

7. The method according to claim 6, further comprising subjecting the coating film to reduce an overall pressure to a final pressure of 10 to 100 Pa before the heating.

8. A cured article obtained by curing the resin composition according to claim 1.

9. A flexible substrate comprising the cured article according to claim 8.

10. A flexible display comprising the cured article according to claim 8.

11. The resin composition according to claim 1, wherein the content of the cellulose compound is less than 1.0 parts by mass based on 100 parts by mass of the polyamic acid.

12. The resin composition according to claim 1, further comprising a compound including an imidazole skeleton in a molecule, the compound being represented by the following formula (B1) or (B2):

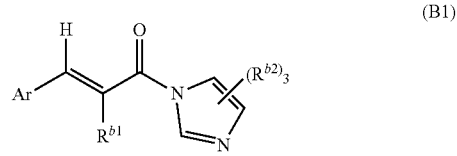

(B1)

wherein, in the formula (B1), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}$(s) each independently represent a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, and Ar is an optionally substituted aromatic group;

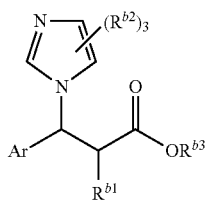

(B2)

wherein, in the formula (B2), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}$(s) are each independently a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, $R^{b3}$ is a hydrogen atom or an organic group, and Ar is an optionally substituted aromatic group.

13. A cured article formed by curing a resin composition comprising a polyamic acid having a structural unit represented by the following formula (1):

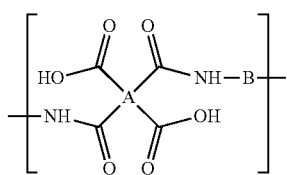

(1)

wherein A is a tetravalent organic group comprising at least one alicyclic group selected from the group consisting of tricyclo cyclic, tetracyclo cyclic, and spirocyclic groups, and B is a divalent organic group; a cellulose compound having a weight average molecular weight of 60,000 or less; and an organic solvent;

wherein a film thickness of the cured article is 2 μm to 1,000 μm, and wherein, when a cured article having a film thickness of 13 μm is obtained by curing the resin composition under the following conditions, an arithmetic average roughness (Ra) measured in accordance with JIS B 0601 is 150 Å or less, the resin composition is first coated on a base and the pressure is reduced to 13 Pa, then after the pressure is returned to a normal pressure, the coated base is heated under an air atmosphere at 80° C. for 10 minutes and then heated under the conditions of an oxygen concentration of 100 ppm at 360° C. for 30 minutes to obtain the cured article having a film thickness of 13 μm.

14. A cured article formed by curing a resin composition comprising: a polyamic acid having a structural unit represented by the following formula (1):

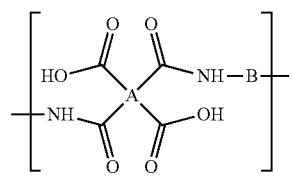

(1)

wherein A is a tetravalent organic group comprising at least one alicyclic group selected from the group consisting of tricyclo cyclic, tetracyclo cyclic, and spirocyclic groups, and B is a divalent organic group; a cellulose compound having a weight average molecular weight of 60,000 or less; and an organic solvent, wherein a film thickness of the cured article is 2 μm to 1,000 μm, and wherein, when a cured article having a film thickness of 13 μm is obtained by curing the resin composition under the following conditions, a transmittance at a wavelength of 450 nm to be measured is 70% or more, the resin composition is first coated on a base and the pressure is reduced to 13 Pa, then after the pressure is returned to a normal pressure, the coated base is heated under an air atmosphere at 80° C. for 10 minutes and then heated under the conditions of an oxygen concentration of 100 ppm at 360° C. for 30 minutes to obtain the cured article having a film thickness of 13 μm.

15. The cured article according to claim 13, wherein the content of the cellulose compound is 1.5 parts by mass or less or 1.0 parts by mass or less based on 100 parts by mass of the polyamic acid.

16. The cured article according to claim 14, wherein the content of the cellulose compound is 1.5 parts by mass or less or 1.0 parts by mass or less based on 100 parts by mass of the polyamic acid.

17. The cured article according to claim 13, wherein the resin composition further comprises a compound including an imidazole skeleton in a molecule, the compound being represented by the following formula (B1) or (B2):

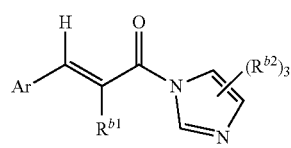

(B1)

wherein, in the formula (B1), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}$(s) each independently represent a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, and Ar is an optionally substituted aromatic group;

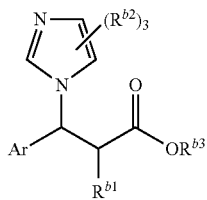

(B2)

wherein, in the formula (B2), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}(s)$ are each independently a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, $R^{b3}$ is a hydrogen atom or an organic group, and Ar is an optionally substituted aromatic group.

18. The cured article according to claim 14, wherein the resin composition further comprises a compound including an imidazole skeleton in a molecule, the compound being represented by the following formula (B1) or (B2):

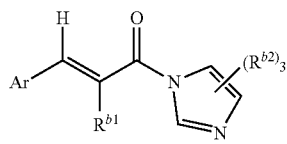

(B1)

wherein, in the formula (B1), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}(s)$ each independently represent a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, and Ar is an optionally substituted aromatic group;

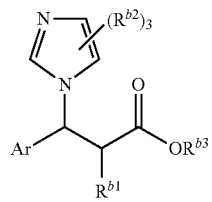

(B2)

wherein, in the formula (B2), $R^{b1}$ is a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group, $R^{b2}(s)$ are each independently a hydrogen atom, a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group, $R^{b3}$ is a hydrogen atom or an organic group, and Ar is an optionally substituted aromatic group.

19. A flexible substrate comprising the cured article according to claim 13.

20. A flexible display comprising the cured article according to claim 14.

* * * * *